(12) United States Patent
Chen et al.

(10) Patent No.: US 11,977,968 B2
(45) Date of Patent: May 7, 2024

(54) SPARSE PROCESSING IN NEURAL NETWORK PROCESSORS

(71) Applicant: Shanghai Cambricon Information Technology Co., Ltd., Pudong New Area (CN)

(72) Inventors: Tianshi Chen, Pudong New Area (CN); Yimin Zhuang, Pudong New Area (CN); Daofu Liu, Pudong New Area (CN); Xiaobin Chen, Pudong New Area (CN); Zai Wang, Pudong New Area (CN); Shaoli Liu, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 1122 days.

(21) Appl. No.: 16/476,261

(22) PCT Filed: Apr. 17, 2018

(86) PCT No.: PCT/CN2018/083379
§ 371 (c)(1),
(2) Date: Jul. 5, 2019

(87) PCT Pub. No.: WO2018/192492
PCT Pub. Date: Oct. 25, 2018

(65) Prior Publication Data
US 2020/0034698 A1    Jan. 30, 2020

(30) Foreign Application Priority Data

Apr. 20, 2017  (CN) .......................... 201710261742.3
Apr. 25, 2017  (CN) .......................... 201710279655.0
Apr. 25, 2017  (CN) .......................... 201710279834.4

(51) Int. Cl.
*G06N 3/063*    (2023.01)
*G06N 3/08*     (2023.01)

(52) U.S. Cl.
CPC .............. *G06N 3/063* (2013.01); *G06N 3/08* (2013.01)

(58) Field of Classification Search
CPC ........................................................ G06N 3/063
See application file for complete search history.

(56) References Cited

U.S. PATENT DOCUMENTS 5,210,870 A  *  5/1993  Baum .................. G06F 16/284
                                                  707/758
6,205,247 B1 *  3/2001  Breuer ............... G06F 18/2453
                                                  382/156
(Continued)

FOREIGN PATENT DOCUMENTS

CN    101925877 A    12/2010
CN    105874477 A    8/2016
(Continued)

OTHER PUBLICATIONS

Zhang et al. (Cambricon-X: An Accelerator for Sparse Neural Networks, Oct. 2016, pp. 1-12) (Year: 2016).*
(Continued)

*Primary Examiner* — George Giroux
(74) *Attorney, Agent, or Firm* — Getech Law LLC; Jun Ye

(57) ABSTRACT

The present application provides an operation device and related products. The operation device is configured to execute operations of a network model, wherein the network model includes a neural network model and/or non-neural network model; the operation device comprises an operation unit, a controller unit and a storage unit, wherein the storage unit includes a data input unit, a storage medium and a scalar data storage unit. The technical solution provided by this application has advantages of a fast calculation speed and energy-saving.

26 Claims, 12 Drawing Sheets

(56) References Cited

U.S. PATENT DOCUMENTS

2012/0246533 A1* 9/2012 Palotai .............. G06F 18/21345
714/E11.023
2017/0061328 A1   3/2017 Majumdar et al.
2017/0212727 A1* 7/2017 Chhugani ........... G06F 9/30014

FOREIGN PATENT DOCUMENTS

CN       106447034 A    2/2017
CN       105512723 B    2/2018
WO      20160154440 A1  9/2016

OTHER PUBLICATIONS

Liu et al. (Cambricon: An Instruction Set Architecture for Neural Networks, Jun. 2016, pp. 393-405) (Year: 2016).*
Jun et al. (In-Storage Embedded Accelerator for Sparse Pattern Processing, Sep. 2016, pp. 1-7) (Year: 2016).*
EP 19199531.5—Communication pursuant to Article 94(3) EPC, dated May 30, 2022, 10 pages.
EP18787049.8, European Search Report dated Mar. 24, 2020, 3 pages.
"9.6 Merge Sort", Retrieved from internet URL: http://www.junshilei.cn/n/print.jsp, Mar. 24, 2020, 4 pages.
CN201710279834.4—First Office Action dated Apr. 8, 2020, 19 pages.

\* cited by examiner

SPARSE PROCESSING IN NEURAL NETWORK PROCESSORS

TECHNICAL FIELD

The present application relates to an artificial intelligence technical field, and particularly relates to an operation device and related products.

BACKGROUND

The concept of deep learning stems from studies of artificial neural networks. A multilayer perceptron with multiple hidden layers is a deep-learning structure. By combining with low-level features, the deep learning forms a more abstract high level representing attribute categories or features, to discover a distributed feature representation of data.

It is found in practice that the existing deep-learning system usually needs to occupy a large amount of storage resources and operation resources, especially for complex operation, which greatly reduces the system operation efficiency. Therefore, the problem of how to reduce the storage resource and operation resource consumption in the deep learning has to be settled urgently.

SUMMARY

The embodiments of the present application provide an operation device and related products capable of reducing storage resource and operation resource consumption in the deep learning.

In a first aspect, the embodiments of the present invention provides an operation device which comprises a storage unit, an operation unit, and a controller unit, wherein the storage unit is configured to store data and instructions;

the controller unit is configured to extract, from the storage unit, a first instruction including sorting instructions or sparse processing instructions and a first data corresponding to the first instruction including input neuron data and weight data;

the operation unit is configured to, in response to the first instruction, perform an operation corresponding to the first instruction on the input neuron data and the weight data, to obtain an operation result.

In a second aspect, the embodiments of the present application provide an operation method applied to the operation device which comprises a storage unit, an operation unit, and a controller unit, wherein the storage unit is configured to store data and instructions;

the controller unit is configured to extract, from the storage unit, a first instruction including sorting instructions or sparse processing instructions and a first data corresponding to the first instruction including input neuron data and weight data;

the operation unit is configured to, in response to the first instruction, perform an operation corresponding to the first instruction on the input neuron data and the weight data, to obtain an operation result.

In a third aspect, the embodiments of the present application provide a neural network calculating device which includes one or more operation devices according to the first aspect, wherein the neural network calculating device is configured to acquire data to be operated and control information from other processing devices, perform specified neural network operation and transmit the execution result to other processing devices through the I/O interface;

when the neural network calculating device contains a plurality of said operation devices, the plurality of operation devices may be connected via a specific structure and transmit data;

wherein, the plurality of operation devices conduct interconnect through Peripheral Component Interconnect-Express (PCI-E or PCIe) PCIE bus and transmit data to support operation on a larger-scale neural network; the plurality of operation devices share the same control system or have their own control systems; the plurality of the operation devices share a memory or have their own memories; and the interconnection manner of the plurality of operation devices is an arbitrary interconnection topology.

In a fourth aspect, the embodiments of the present application provide a combined processing device which includes the operation device, the universal interconnect interface and other processing devices according to the first aspect. The neural network calculating device interacts with other processing devices described above to perform user-specified operations.

In a fifth aspect, the embodiments of the present application provide a neural network chip which includes the operation device according to the first aspect, the neural network calculating device according to the third aspect or the combined processing device according to the fourth aspect.

In a sixth aspect, the embodiments of the present application provide a neural network chip package structure which includes the neural network chip according to the fifth aspect;

In a seventh aspect, the embodiment of the present application provides a board card which includes the neural network chip package structure according to the sixth aspect.

In an eighth aspect, the embodiments of the present application provide an electronic device which includes the neural network chip according to the sixth aspect or the board card according to the seventh aspect.

It can be seen from the solution of the embodiments of the present application that the storage unit stores data and instructions, a controller unit configured to extract, from the storage unit, a first instruction including sorting instructions or sparse processing instructions and a first data corresponding to the first instruction including input neuron data and weight data and the operation unit performs a calculating operation corresponding to the first instruction on the input neuron data and the weight data in response to the first instruction to obtain an operation result, thereby reducing the storage resource and operation resource consumption in the deep learning and improving the operation efficiency.

In addition, in some embodiments, the electronic device includes a data processing device, a robot, a computer, a printer, a scanner, a tablet PC, an intelligent terminal, a mobile phone, an automobile data recorder, a navigator, a sensor, a camera, a server, a cloud server, a video camera, a projector, a watch, an earphone, a movable storage, a wearable device, a vehicle, a household appliance and/or a medical device.

In some embodiments, the vehicle includes an airplane, a ship and/or a car; the household appliance includes a television, an air conditioner, a microwave oven, a refrigerator, a rice cooker, a humidifier, a washing machine, an electric lamp, a gas stove, a range hood; and the medical device includes nuclear magnetic resonance, B-ultrasonic and/or electrocardiographs.

BRIEF DESCRIPTION OF THE DRAWINGS

In order to more clearly illustrate the technical solutions in the embodiments of the present application, the drawings used in the description of the embodiments will be briefly introduced below. Obviously, the drawings in the following description are some embodiments of the present application, an ordinary person skilled in the art can also obtain other drawings based on these drawings without paying any creative work.

DETAILED DESCRIPTION

The technical solutions in the embodiments of the present application are clearly and completely described in the following with reference to the accompanying drawings in the embodiments of the present application. It is obvious that the described embodiments are a part of the embodiments of the present application, and not all of the embodiments. All other embodiments obtained by an ordinary person skilled in the art based on the embodiments of the present application are all within the protection scope of the present application.

The terms "first", "second", "third", "fourth" and the like in the description, the claims and the drawings of the present application are used to distinguish different objects rather than describing a specific order. Furthermore, the terms "include", "have" and any other transformations intended to cover a non-exclusive inclusion. For example, a process, method, system, product, or device that comprises a series of steps or units is not limited to the listed steps or units, but optionally also includes steps or units not listed or optionally includes other steps or units inherent to these processes, methods, products or devices.

"Embodiments" mentioned herein mean that a particular feature, structure, or characteristic described in connection with the embodiments included in at least one embodiment of the present application. The appearances of the phrases in various places in the specification are not necessarily referring to the same embodiments, nor independent or alternative embodiments that are mutually exclusive to other embodiments. What a person skilled in the art explicitly and implicitly understands is that the embodiments described herein can be combined with other embodiments.

Figure 1A:
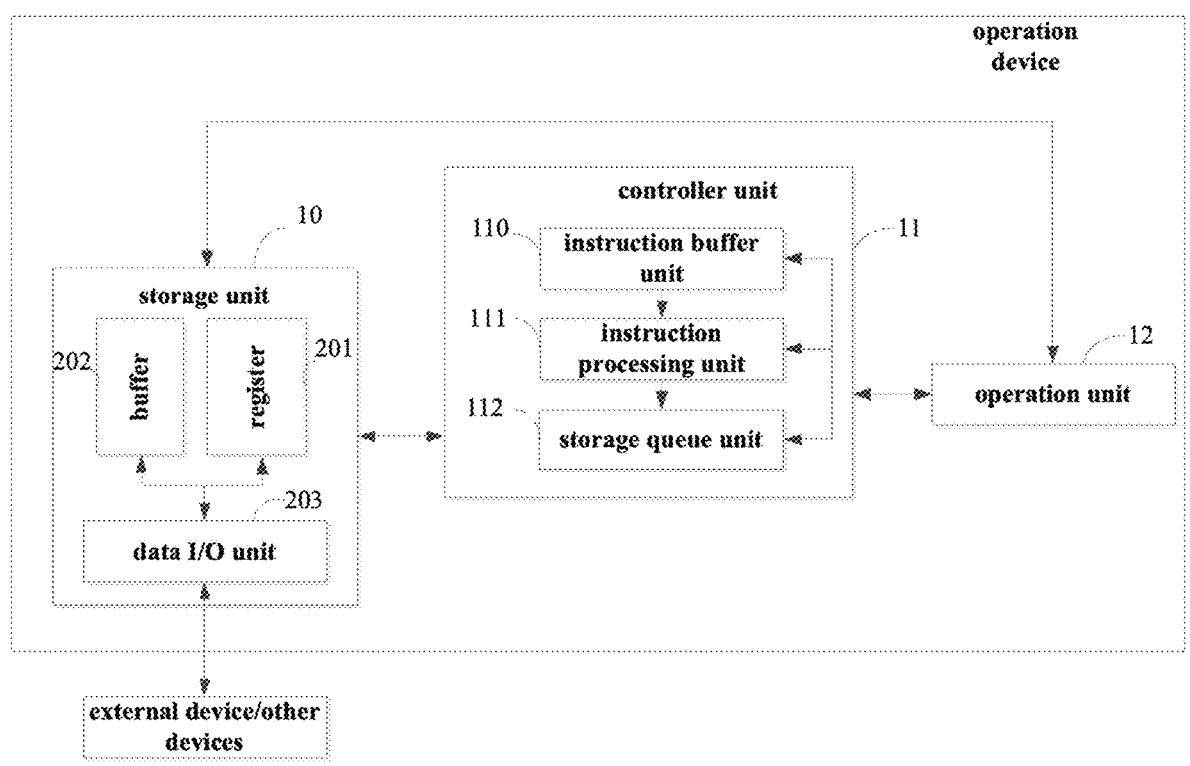
FIG. 1A shows a structural schematic diagram of an operation device according to embodiments of the present application.

The operation unit used in the present application will be described at first. Referring to FIG. 1A, there is an operation device comprising: a storage unit 10, a controller unit 11 and an operation unit 12, wherein the controller unit 11 and the storage unit 10 and the operation unit 12;

the storage unit 10 may include a data input/output unit (data I/O unit) 203, the data input/output unit 203 is configured to acquire input data, weight data, a network model, and operation instructions;

the controller unit 11 is configured to extract a first instruction from the storage unit, parse the first instruction to obtain an operation code of the operation instruction and an operation domain, extract input data and weight data corresponding to the operation domain, and the operation code, the input data and the weight data are transmitted to the operation unit, and the operation code includes at least one of the following codes: an operation code of the matrix operation instruction, a vector operation instruction operation code, an activation operation instruction operation code, an offset operation instruction operation code, a convolution operation instruction operation code, a conversion operation instruction operation code and the like;

the operation unit 12 is configured to perform an operation corresponding to the operation code on the input data and the weight data according to the operation code to obtain a result of the first instruction.

Optionally, the controller unit includes an instruction buffer unit 110 configured to buffer the instructions, an instruction processing unit 111 configured to implement decoding function and a storage queue unit 113;

the instruction buffer unit 110 is configured to buffer the first instruction;

the instruction processing unit 111 is configured to parse the first instruction to obtain an operation code of the first instruction and an operation domain;

the storage queue unit 113 is configured to store an instruction queue including a plurality of operation instructions or operation codes to be performed in a sequential order of that queue.

The operation instructions may include one or more operational domains and an operation code. The operation instructions may include neural network operational instructions. Taking the neural network operation instruction as an example, as shown in Table 1, the register number 0, the register number 1, the register number 2, the register number 3, and the register number 4 therein may be taken as an operation domain and each register number 0, register number 1, register number 2, register number 3, and register number 4 therein may be taken as the number of one or more registers.

| OPERATION CODE | register number 0 | register number 1 | register number 2 | register number 3 | register number 4 |
|---|---|---|---|---|---|
| COMPUTE | input data initial address | input data length | weight value initial address | weight value length | interpolation table address of activation function |
| IO | address of external data memory | data length | address of inner data memory | | |
| NOP | | | | | |
| JUMP | target address | | | | |
| MOVE | input address | data size | output address | | |

Optionally, the storage unit may further include a register 201, a buffer 202 and a data I/O unit.

The storage medium 201 may be an off-chip memory, and of course in an actual application, may also be an on-chip memory for storing data blocks. The data block may be n-dimensional data, and n is an integer greater than or equal to 1, for example, when n=1, the data block is a one-dimensional data, that is, a vector; if n=2, the data block is a two-dimensional data, that is, a matrix; and if n=3 or more, the data block is a multi-dimensional tensor.

Optionally, the above first instruction may be a vector instruction which may be at least one of a vector addition instruction (VA), a vector plus scalar instruction (VAS), a vector subtraction instruction (VS), and a vector multiplication instruction (VMV), a vector multiplying scalar instruction (VMS), vector division instruction (VD), a vector dividing scalar instruction (SDV), an inter-vector AND instruction (VAV), an inter-vector AND instruction (VAND), an inter-vector OR instruction (VOV), an intra-vector OR instruction (VOR), a vector index instruction (VE), a vector logarithmic instruction (VL), a vector greater-than decision instruction (VGT), a vector equal-to decision instruction (VEQ), a vector NOT instruction (VINV), a vector selection and merge instruction (VMER), a vector maximum instruction (VMAX), a scalar extended instruction (STV), a scalar-vector replacement instruction (STVPN), a vector-scalar replacement instruction (VPNTS), a vector retrieval instruction (VR), a vector dot product instruction (VP), a random vector instruction (RV), a cyclic shift instruction (VCS), a vector load instruction (VLOAD), a vector storage instruction (VS), a vector move instruction (VMOVE), a matrix multiplying vector instruction (MMV), a vector multiplying matrix instruction (VMM), a matrix multiplying scalar instruction (VMS), a tensor operation instruction (TENS), a matrix addition instruction (MA), a matrix subtraction instruction (MS), a matrix retrieval instruction (MR), a matrix load instruction (ML), a matrix storage instruction (MS), a matrix move instruction (MMOVE).

Figure 1B:
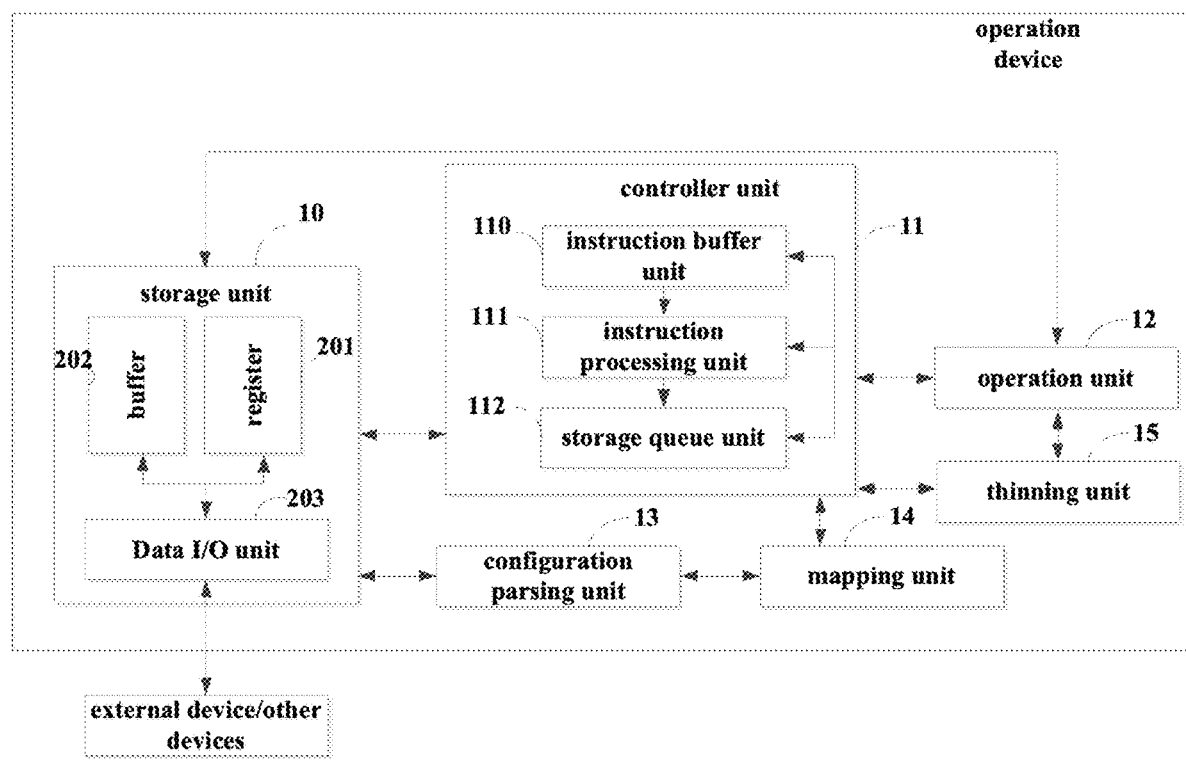
FIG. 1B shows another structural schematic diagram of an operation device according to embodiments of the present application.

Optionally, as shown in FIG. 1B, FIG. 1B is a modified structure of the operation device described in FIG. 1A, and the operation device may further include a configuration parsing unit 13, a mapping unit 14 and a sparse unit 15 as compared with FIG. 1A, specifically:

the storage unit 10 is configured to store data and instructions;

the controller unit 11 is configured to extract, from the storage unit, a first instruction including sorting instructions or sparse processing instructions and a first data corresponding to the first instruction including input neuron data and weight value;

the operation unit 12 is configured to perform an operation corresponding to the first instruction on the input neuron data and the weight data in response to the first instruction, to obtain an operation result, wherein the operation unit 12 can support operations of a plurality of types of data, and select corresponding operation units according to the instruction requirements to complete the corresponding operations, for example, the data type can be 16-bit fixed point data or 32-bit floating point data. Specifically, if the instruction is a matrix plus a matrix, the adder is selected; if the instruction is a matrix multiplying by a matrix, the multiplier and the adder are selected, if the instruction is a 16-bit fixed-point operation instruction, the instruction is received for a 16-bit fixed-point operation, and the like.

The data may include at least one of the following data types: integer data, discrete data, continuous data, power type data, floating point data, or fixed point data, and the length represented by data may be a 32-bit length floating point number, a 16-bit length fixed point data and the like; the data may include at least one of the following data: the input neuron data, the weight data, and the offset data.

Optionally, when the first instruction is the sparse processing instruction and the first data further includes preset configuration data, where the configuration parsing unit 13 is configured to set a mapping mode according to the preset configuration data.

the mapping unit 14 is configured to perform mapping processing on the input neuron and the weight data according to the mapping mode to obtain an input neuron-weight pair which is a mapping relationship between the input neuron data and the weight data after mapping processing;

the instruction buffer unit 110 is configured to receive a target instruction transmitted by the controller unit;

the instruction processing unit 111 is configured to decode the target instruction into an operation instruction, and performs a calculating operation on the input neuron-weight pair by the operation unit to obtain an operation result, wherein the preset configuration data may include at least one of data types or sparse parameters. The target instruction is a matrix multiplying by a matrix calculation instruction, which is decoded to obtain an operation instruction, and the operation instruction may include a multiplication operation instruction and an addition operation instruction. The first instruction includes at least one target instruction.

Optionally, the sparse unit 15 is configured to perform a sparse processing on the operation result according to the sparse parameters to obtain an operation result after the sparse processing.

Optionally, the sparse parameters include a sparse mode; the mapping unit 13 performs a mapping processing on the input neuron and the weight according to the mapping mode, specifically:

Obtaining, when the sparse mode is the first sparse mode, a weight sparse sequence corresponding to the first sparse mode and performing a mapping processing on the weight according to that weight sparse sequence;

Obtaining, when the sparse mode is the second sparse mode, a neuron sparse sequence corresponding to the second sparse mode and performing a mapping processing on the input neuron according to the neuron sparse sequence;

Obtaining, when the sparse mode is the third sparse mode, a weight sparse sequence and a neuron sparse sequence corresponding to the third sparse mode and performing a mapping processing on the input neuron and the weight data according to the weight sparse sequence and the neuron sparse sequence.

Optionally, the sparse parameters may include at least one of the following: a sparse flag, a sparse rate, a sparse mode, and the like, wherein the sparse flag is used to determine whether it is possible to perform a sparse processing, for example, 0 represents not performing a sparse processing, 1 represents performing a sparse processing; or 1 represents not performing a sparse processing, 0 represents performing a sparse processing instead. It can be understood that it is also possible to flexibly select the representation of the sparse flag according to the demand. In the case of performing the sparse processing, the sparse rate indicates the ratio of the neuron data and/or the weight data each time the sparse processing is performed, for example, 5%, 10%, 25% and the like. The sparse mode represents a specific mode of sparse processing. In the embodiments of the present application, the sparse mode mainly includes at least three types: a sparse mode 1 where only taking sparse processing to the weight, a sparse mode 2 where only taking sparse processing to the neuron data and a sparse mode 3 where taking sparse processing to the weight and the neuron data. Of course, the sparse mode can also be combined by at least two of the above modes, for example, sparse mode 1+sparse mode 2. In addition, in the case where the sparse processing is not performed, the corresponding sparse mode is recorded as mode 0. For another example, the sparse rate of the neuron data and the sparse rate of the weight data may be different, for example, the embodiments of the present application provides a representation of the sparse rate (A, B), where A is the sparse rate of the neuron data, B is the sparse rate of the weight data, for example, (5%, 6%), that is, the sparse rate of the neuron data is 5% and the sparse rate of the weight data is 6%.

Optionally, in the absence of the sparse flag, at least the following four sparse modes are included: a sparse mode 0 where no sparse is performed; a sparse mode 1 where only taking sparse processing to the weight data; a sparse mode 2 where only taking sparse processing to the neuron data; a sparse mode 3 where taking sparse processing to the weight and neuron data.

For example, when the output neuron data of the proceeding layer is used as the input neuron data of the succeeding layer, and since sparse processing has been made to the output neuron data, in the operation of the succeeding layer, if the criteria of the sparse is not changed, sparse processing is unnecessarily to be repetitively made to the input neuron data.

Wherein, the sparse mode obtained by parsing the configuration data of the neural network by the configuration parsing unit 13 further sets the processing mode of the mapping unit, that is, corresponding to different mapping modes according to different sparse modes.

Optionally, the mapping relationship between the sparse mode and the mapping mode is pre-stored in the storage unit, and then the mapping mode corresponding to the sparse mode is determined according to the mapping relationship, and the sparse is carried out according to the neuron sparse sequence and the weight sparse sequence in different mapping modes. Of course, the mapping relationship is not necessarily stored in the storage unit but may be stored on the off-chip memory, or may be stored on other devices (electronic devices having storage functions). The weight sparse sequence and/or the neuron sparse sequence may be pre-stored in the storage unit.

Optionally, the sparse unit 15 performs sparse processing on the operation result according to the sparse parameters, specifically:

sorting the absolute values of the elements of the neuron data, calculating the number of elements that need to be taken sparse processing according to the sparse rate, then performing a sparse processing on the elements of the sorted neuron data according to the number of elements that need to be taken sparse processing, and transmitting the sparse neuron data after being taken sparse processing and neuron sparse sequences to the controller unit 11, wherein it is possible to sort the absolute values of the elements of the output neurons, the number of elements that need to be taken sparse processing is operated according to the sparse rate, and then the elements whose element absolute values of the output neurons are less than a preset threshold are taken sparse processing, that is, the value is set to 0, the preset threshold can be set by the user voluntarily or the system defaults, and the sparse rate can be dynamically adjusted.

Optionally, the sparse unit 15 performs a sparse processing on the operation result according to the sparse parameters, specifically:

the elements whose neuron data are 0 remains unchanged, and the elements whose neuron data is within the preset value interval are set to 0, wherein the elements whose neuron data are 0 remains unchanged, and the elements whose neuron data is within the preset value interval are set to 0, and the preset value space can be set by the user or the system defaults.

Figure 1C:
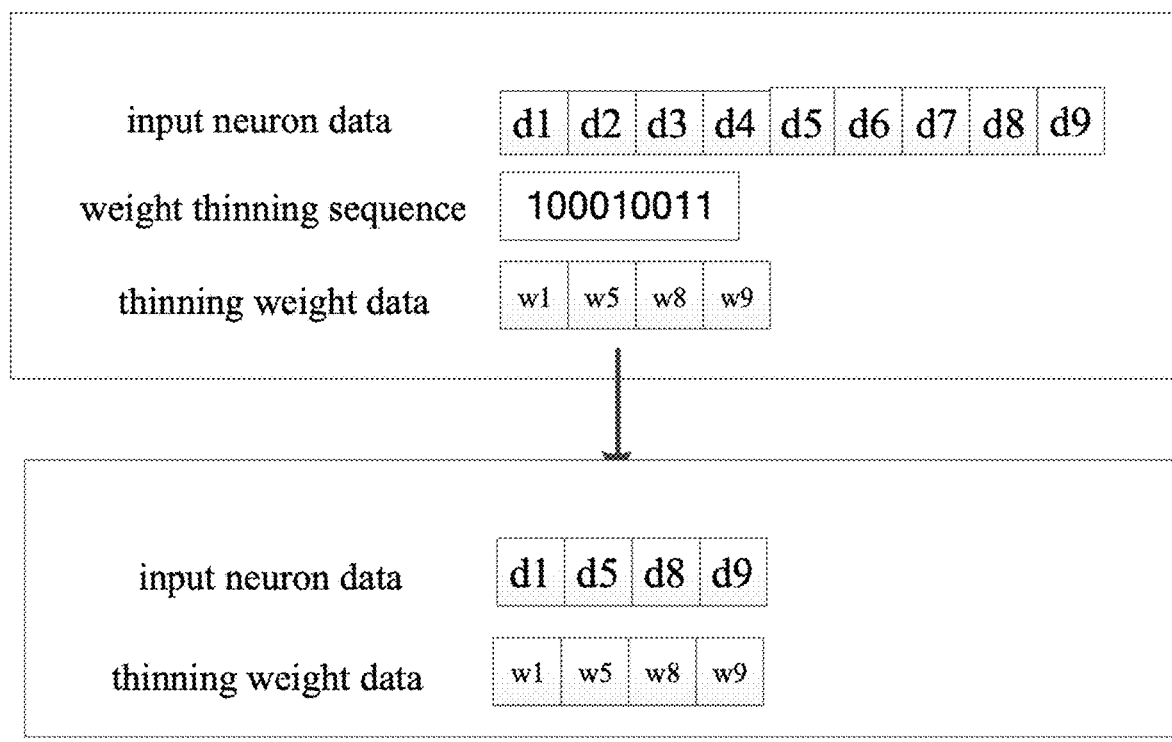
FIG. 1C shows a schematic diagram of a processing of the sparse mode 1 according to embodiments of the present application.

By way of example, as shown in FIG. 1C, FIG. 1C is an exemplary diagram of sparse mode 1, wherein the sparse weight data only includes non-zero data in the weight and only the weight data of w1, w5, w8, and w9 are stored, and the weight sparse sequence is used to index the sparse weights, for example, the weight sparse sequence is 100010011, indicating the weights of w1, w5, w8 and w9 are non-zero values, and those of w2, w3, w4, w6 and w7 are 0. The representation of the sparse sequences is not unique, 0 can be used to represent non-sparse, that is, the value is non-zero, and 1 is used to represent sparse, that is, the value is zero, and other feasible methods can also be used. According to the weighted sparse sequence, the corresponding input neuron data is selected, and d1, d5, d8, and d9 are selected as input neuron data in FIG. 1C, and the corresponding input neuron-weight pair is obtained by mapping the input neuron data and the weight data.

Figure 1D:
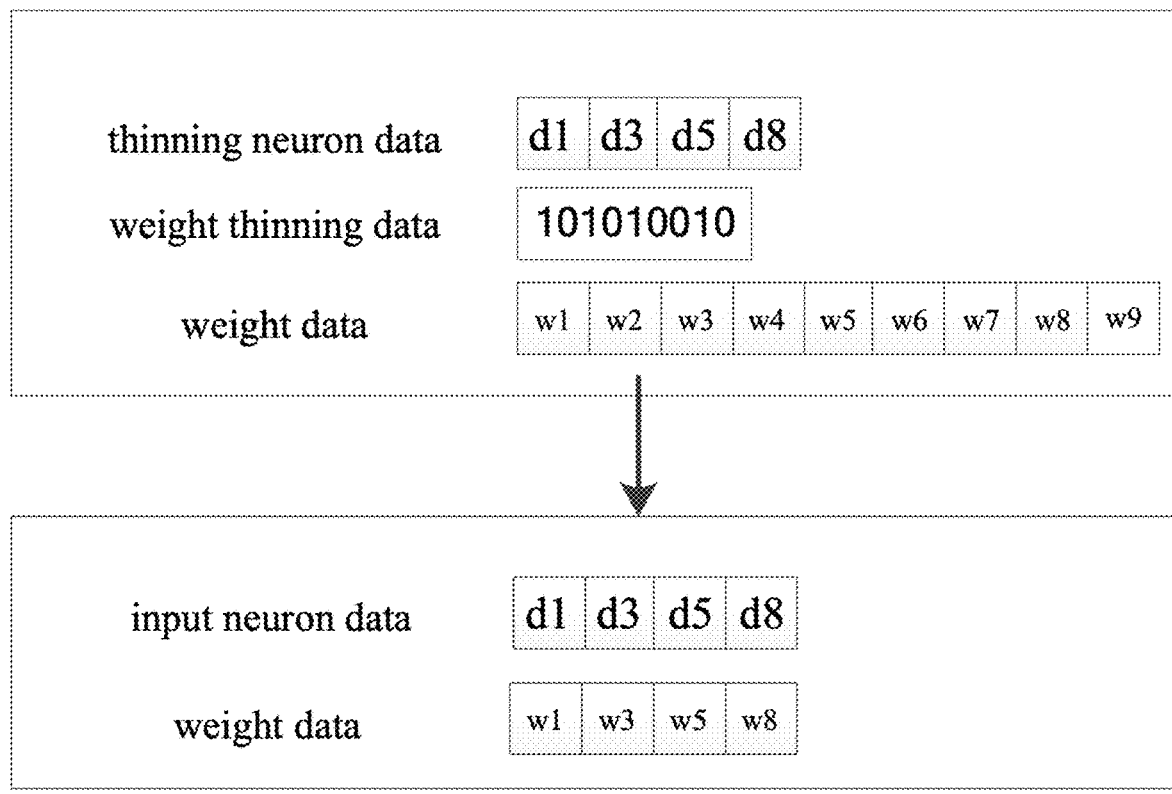
FIG. 1D shows a schematic diagram of a processing of the sparse mode 2 according to embodiments of the present application.

For another example, as shown in FIG. 1D, FIG. 1D is an exemplary diagram of the sparse mode 2 provided by the embodiments of the present application, in which the sparse neuron data includes only non-zero data in the neuron, and only neuron data of d1, d3, d5, d8 are stored, as in FIG. 1D, the neuron sparse sequence is used to index sparse neuron data, such as neuron sparse sequence 101010010 indicates that neurons of d1, d3, d5, d8 are non-zero, and those of d2, d4, d6, d7, d9 are 0. It should be recognized that the representation of the sparse sequence is not unique, and 0 can be used to indicate non-sparse, that is, the value is non-zero, and 1 represents sparse, that is, the value is zero, and other feasible methods can also be used. The corresponding weight data is selected according to the neuron sparse sequence, for example, the weight data of w1, w3, w5, w8 are selected as shown in FIG. 1D, and the input neuron data and the weight data are mapped to obtain corresponding input neuron-weight pairs.

Figure 1E:
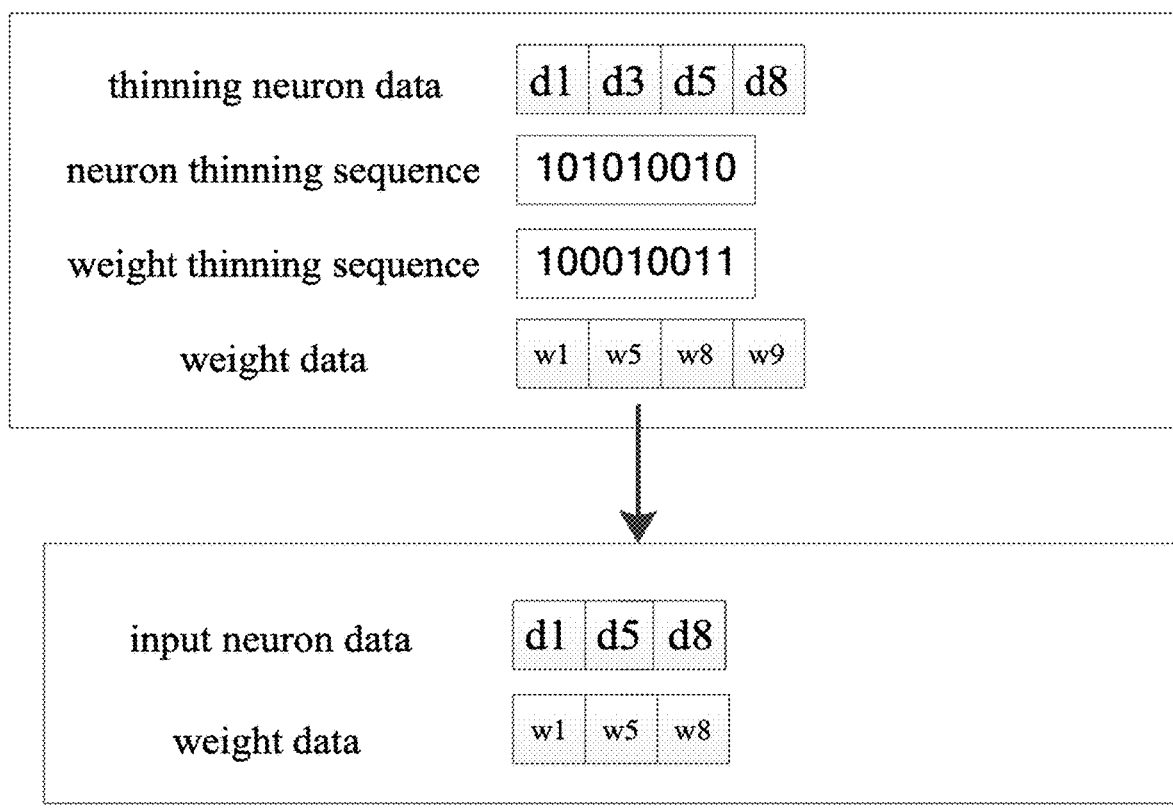
FIG. 1E shows a schematic diagram of a processing of a sparse mode 3 according to embodiments of the present application.

For another example, as shown in FIG. 1E, FIG. 1E is an exemplary diagram of a sparse mode 3 according to the embodiments of the present application, that is, input neuron data and weight data are selected to be non-zero values according to a neuron sparse sequence and a weight sparse sequence. As shown in FIG. 1E, the neuron data d1, d5, d8 and the weight data w1, w5, w8 are selected to obtain the corresponding input neuron-weight pair by mapping the input neuron data and the weight data.

Optionally, based on the foregoing operation device, the operation method may be implemented as follows:

the storage unit 10 stores data and instructions;

the controller unit 11 extracts, from the storage unit 10, a first instruction and first data corresponding to the first instruction, the first data includes input neuron data and weight data, and the first instruction includes sorting instructions or sparse processing instructions;

the operation unit 12, in response to the first instruction, performs a calculating operation corresponding to the first instruction on the input neuron data and the weight data to obtain an operation result.

Further optionally, the controller unit 11 includes an instruction buffer unit 110 and an instruction processing unit 111.

Further optionally, when the first instruction is the sparse processing instruction and the first data further includes preset configuration data, where the configuration parsing unit 13 sets a mapping mode according to the preset configuration data;

the mapping unit 14 performs mapping processing on the input neuron and the weight data according to the mapping mode to obtain an input neuron-weight pair which is a mapping relationship between the input neuron data and the weight data after the mapping processing;

the instruction buffer unit 110 receives a target instruction transmitted by the controller unit;

the instruction processing unit 111 decodes the target instruction into an operation instruction; and the operation unit 12 performs a calculating operation on the input neuron-weight pair to obtain an operation result.

Further optionally, the first data further includes sparse parameters; and the method further includes the following steps:

the sparse unit 15 performs sparse processing on the operation result according to the sparse parameters to obtain an operation result after the sparse processing.

Further optionally, the sparse parameters include a sparse mode;

the mapping unit 14 performs mapping processing on the input neuron and the weight according to the mapping mode, specifically:

obtaining, when the sparse mode is a sparse mode 1, a weight sparse sequence corresponding to the sparse mode 1 and performing a mapping processing on the weight according to the weight sparse sequence;

obtaining, when the sparse mode is a sparse mode 2, a neuron sparse sequence corresponding to the sparse mode 2, and performing mapping processing on the input neuron according to the neuron sparse sequence;

obtaining, when the sparse mode is a sparse mode 3, a weight sparse sequence and a neuron sparse sequence corresponding to the sparse mode 3 and performing a mapping processing on the input neuron and the weight data according to the weight sparse sequence and the neuron sparse sequence.

Further optionally, the sparse parameters further include a sparse rate, and the sparse unit 15 performs sparse processing on the operation result according to the sparse parameter, specifically:

sorting the absolute values of the elements of the neuron data, calculating the number of elements that need to be taken sparse processing according to the sparse rate, performing a sparse processing on the elements of the sorted neuron data according to the number of elements that need to be taken sparse processing, and transmitting the sparse neurons data after being taken sparse processing and the neuron sparse sequences to the controller unit 11.

Further optionally, the sparse unit 15 performs sparse processing on the operation result according to the sparse parameter, specifically:

the elements whose neuron data are 0 remains unchanged, and the elements whose neuron data is within the preset value interval are set to 0.

the operation device and method described in the above application support the mapping processing of the neural network, and can adopt different mapping modes according to different practical situations, thereby achieving the purpose of saving storage resources and operation resources; in addition, the sparse processing that supports the neural network and the neural network represented by multiple data can use different data representations and sparse processing according to different practical applications, thereby further saving operation on the neural network performance and improving the performance on storing resources, and then achieving optimal results, performing a sparse processing on data to reduce the operation load of the operation unit and speed up the operation.

Optionally, the operation device described in FIG. 1A can also be used to implement the following vector sorting function, specifically as follows:

if the input neuron data is a vector; in the embodiments of the present application, the first instruction includes a vector sorting instruction and the first data includes an data vector to be sorted and an intermediate result of the data vector to be sorted, the first instruction may specifically refer to an instruction to be launched or an instruction at the forefront of the instruction queue.

The instruction processing unit 111 is configured to decode the vector sorting instruction into a microinstruction performed by the operation unit 12;

the operation unit 12 is further configured to sort the data vector to be sorted or the intermediate result according to the microinstruction to obtain a sorted vector having the same length as the data vector to be sorted.

Optionally, the operation unit 12 may dynamically select a sorting method to complete the vector sorting operation by means of instruction configuration. The sorting method may include at least one of the following: bubble sort, selection sort, quick sort, merge sort, or binary sort.

Optionally, the controller unit 11 acquires the first instruction to be performed from the storage unit 10, and if the first instruction is a vector sorting instruction, microinstructions are generated according to the vector sorting type, the length of the data vector to be sorted, and the source operand address, the destination operand address, the vector length, and the sort type of the vector sorting instruction, and the operation unit 12 performs a sorting operation in response to the microinstructions.

As shown in the following table, it illustrates an alternative format for vector sorting instructions as follows:

| Operand OP | Vector Source Address SRC | Vector Destination Address DST | Vector Length LEN | Sort Type |
|---|---|---|---|---|

Wherein the operation code OP has a length of k bits, for example, the specific content is $b_1b_2 \ldots b_k$, the operation code OP is used to indicate that the operation performed by the instruction is a vector sorting operation, if the first k bits of a certain instruction are inconsistent with $b_1b_2 \ldots b_k$, it indicates the instruction is used to implement other calculating operations, and if the first k bits of a certain instruction is consistent with $b_1b_2 \ldots b_k$, it indicates that the instruction is a vector sorting instruction.

The vector source address SRC has a length of q bits, and when the operation code is $b_1b_2 \ldots b_k$, it indicates the address of the data vector to be sorted in the storage unit, and q is greater than 0;

the vector destination address DST has a length of q bits, and when the operation code is $b_1b_2 \ldots b_k$, it indicates the address of the sorted vector in the storage unit, and q is greater than 0;

the length of the vector is LEN, which has a length of r bits, and when the operation code is $b_1b_2 \ldots b_k$, it indicates the length of the data vector to be sorted r is greater than 0;

sorting type, the length is 1 or more bits, and when the operation code is $b_1b_2 \ldots b_k$, if the highest bit of the sorting type is 0, it means sorting from small to large, and if the highest bit of the sorting type is 1, it means sorting from large to small; if the length of the sorting type field is a (a>1) bit, the low a−1 bit of the sorting type indicates the sorting method used by the sorting instruction.

Optionally, the operation unit 12 sorts the data vectors to be sorted or the intermediate result according to the microinstruction as follows:

Step A: if what obtained after the sorting is the intermediate result of the data vector to be sorted, writing the intermediate result of the data vector to be sorted back to the source address of the storage unit, and repeatedly executing step A until obtaining the final result of the data vector to be sorted, then go to step B; step B: if what obtained after the sorting is the final result of the data vector to be sorted, writing the final result of the data vector to be sorted back to the data I/O unit of the storage unit according to the destination operand address provided by the vector sorting instruction, and the operation ends.

Figure 1F:
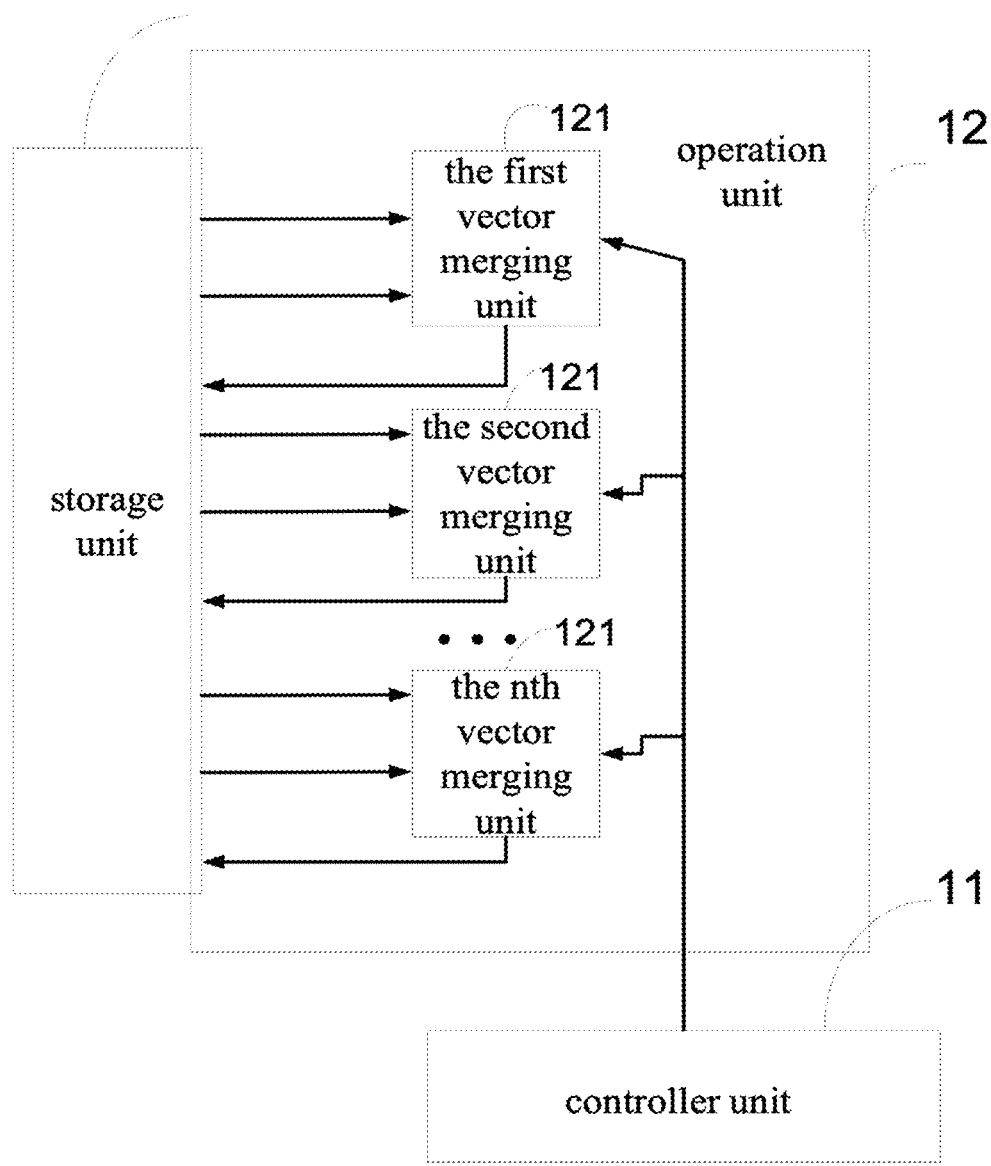
FIG. 1F shows a structural schematic diagram of an operation unit and a connection relationship thereof according to embodiments of the present application.

Optionally, the operation unit 12 includes n vector merging units, where n is an integer greater than or equal to 2; n vector merging units read no more than 2n sub-vectors having been merged or ordered sub-vectors from the storage unit 10 each time, merge them and store the result to the storage unit until the length of the sub-vectors having been merged is equal to the length of the data vector to be sorted to form a sorted vector.

Wherein as shown in FIG. 1F which shows a specific structure of the operation unit 12, the operation unit may include n vector merging units, and the n vector merging units read no more than 2n sub-vectors having been merged or ordered sub-vector from the storage unit 10, merge them and store the result to the storage unit 10 until the length of the sub-vector having been merged is equal to the length of the data vector to be sorted to form a sorted vector.

Figure 1G:
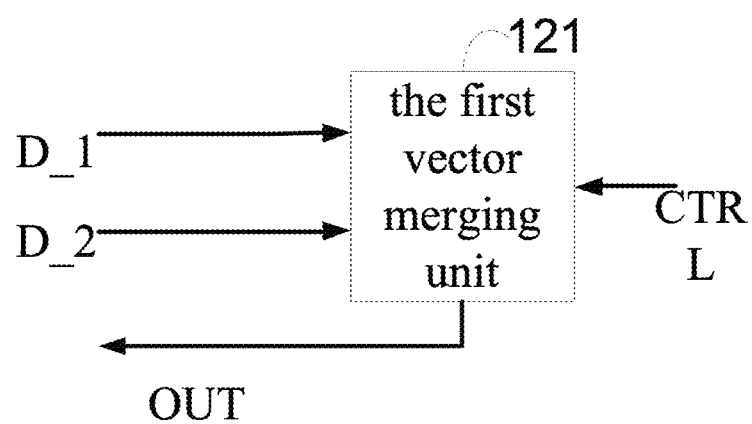
FIG. 1G shows a structural schematic diagram of a first vector merging unit according to embodiments of the present application.

As shown in FIG. 1G the specific structure of the vector merging unit may refer to the first vector merging unit shown in FIG. 1Q and the vector merging unit includes a control signal CTRL (connecting controller unit 11), input vectors D_1 and D_2 (for connecting storage unit 10), the output data is OUT (for connecting the data I/O unit in the storage unit 10), wherein CTRL is used to set the operation type of the vector merging unit and the lengths len_1 and len_2 of the input vectors D_1 and D_2, wherein the operation type can be used to describe the order in which the merge is performed. For example, the operation type may include 0 and 1, and the operation type 0 may be used to indicate that the vector merging unit performs the merging according to the order of the vectors from small to large, and the operation type 1 may be used to indicate that the vector merging unit performs the merging according to the order of the vectors from large to small. In other embodiments, the operation type 1 may be used to indicate that the vector merging unit performs the merging according to the order of the vectors from small to large, and the operation type 0 may be used to indicate that the vector merging unit performs the merging according to the order of the vectors from large to small. It is understandable that the operation type can be set according to the specific demand. Taking two input vectors as an example, if the length of one of the input vectors is 0, another vector can be directly output.

Optionally, the operation unit 12 performs step A specifically as follows:

Step A1: initializing the number of merging i to 1;

Step A2: performing calculation by the n vector merging units, and when merging the data vector to be sorted or the intermediate result at the ith time, obtaining the data vector to be sorted or the intermediate result from the storage unit, dividing the data vector to be sorted or the intermediate result into $[m/2^{i-1}]$ portions in order, and merging the vectors into pairs, each vector except for the last one having a length of $2^{i-1}$, where m is the length of the data vector to be sorted;

Step A3: increasing the number of merging by one if the number of merging i<[$\log_2$ m] and writing the processed intermediate result back to a source address of the storage unit, repeatedly executing steps A2 to A3 until i=[$\log_2$ m], then go to step B; it can be understood that when i=[$\log_2$ m], what obtained after sorting is the final result of the data vector to be sorted.

The operation unit 12 performs step B, specifically:

if the number of merging i=[$\log_2$ m] and if there are only two data vectors to be sorted after assignment, the obtained vector is a vector having been sorted after being merged by the first vector merging unit of the n vector merging units, writing the sorted result in the data output unit according to the destination operand address provided by the vector sorting instruction, and the operation ends.

Optionally, the operation unit 12 merges the vectors in pairs, specifically:

numbering 1, 2, . . . , $[m/2^{i-1}]$ in order according to the source operand address provided based on the vector sorting instruction and distributing the vector numbered 2*j−1, 2*j to the ((j−1) mod n)+1 vector merging unit for processing, where j>0.

Optionally, the data vector to be sorted is a characteristic value vector and a probability vector of the classification result corresponding to the matrix for testing data characteristics at the preprocessing stage.

For example, when the vectors D_1 and D_2 and the operation types 0 are 2, 4, 6, 7 and 3, 3, 8 and 9 respectively, the merging process of it is shown in step 1-7 as follows:

step 1:
D_1: 2 4 6 7                    len_1: 4
D_2: 3 3 8 9                    len_2:4
Output vector: 2
Step 2:
D_1: 4 6 7                      len_1:3
D_2: 3 3 8 9                    len_2:4
Output vector: 2 3
Step 3:
D_1: 4 6 7                      len_1:3
D_2: 3 8 9                      len_2:3
Output vector: 2 3 3
Step 4:
D_1: 4 6 7                      len_1:3
D_2: 8 9                        len_2:2
Output vector: 2 3 3 4
Step 5:
D_1: 6 7                        len_1:2
D_2: 8 9                        len_2:2
Output vector: 2 3 3 4 6
Step 6:
D_1: 7                          len_1:1
D_2: 8 9                        len_2:2
Output vector: 2 3 3 4 6 7
Step 7:
D_1:                            len_1:0
D_2: 8 9                        len_2:2
Output vector: 2 3 3 4 6 7 8 9
the vector merging ends.

By way of example, for the vector sorting instruction (sort_op, src, dst, 9, 0), it is assumed that the data storage unit 1 starts with the address src, and the nine consecutively stored data are 9, 1, 5, 3, 4, 2, 6, 8, 7 respectively, the number of vector merging units is 2. According to the highest bit of the sorting type, the sorting is performed from small to large, and according to the low m−1 bits all 0s of the sort type, the sorted type is merging sort. In the operation process, the input vector, address, and output address corresponding to each vector merging unit each time are as follows:

The first merging:

| vector merging unit 1 | vector 1 | 9 | 4 | 7 |
|---|---|---|---|---|
| | address of vector 1 | src | src + 4 | src + 8 |
| | vector 2 | 1 | 2 | |
| | address of vector 2 | src + 1 | src + 5 | src + 9 |
| | output vector | 1 9 | 2 4 | 7 |
| | address of output vector | src | src + 4 | src + 8 |
| vector merging unit 2 | vector 1 | 5 | | 6 |
| | address of vector 1 | src + 2 | | src + 6 |
| | vector 2 | 3 | | 8 |
| | address of vector 2 | src + 3 | | src + 7 |
| | output vector | 3 5 | | 6 8 |
| | address of output vector | src + 3 | | src + 6 | the merged vectors are 1 9 3 5 2 4 6 8 7;
The second merging:

| vector merging unit 1 | vector 1 | 1 9 | 7 |
|---|---|---|---|
| | address of vector 1 | src | src + 8 |
| | vector 2 | 3 5 | |
| | address of vector 2 | src + 2 | src + 10 |
| | output vector | 1 3 5 9 | 7 |
| | address of output vector | src | src + 8 |
| vector merging unit 2 | Vector 1 | 2 4 | |
| | address of vector 1 | src + 4 | |
| | vector 2 | 6 8 | |
| | address of vector 2 | src + 6 | |
| | output vector | 2 4 6 8 | |
| | address of output vector | src + 4 | | the merged vectors are 1 3 5 9 2 4 6 8 7;
The third merging:

| vector merging unit 1 | vector 1 | 1 3 5 9 |
|---|---|---|
| | address of vector 1 | src |
| | vector 2 | 2 4 6 8 |
| | address of vector 2 | src + 4 |
| | output vector | 1 2 3 4 5 6 8 9 |
| | address of output vector | src |
| vector merging unit 2 | vector 1 | 7 |
| | address of vector 1 | src + 8 |
| | vector 2 | |
| | address of vector 2 | src + 12 |
| | output vector | 7 |
| | address of output vector | src + 8 | the merged vectors are 1 2 3 4 5 6 7 8 7;
The fourth merging:

| vector merging unit 1 | vector 1 | 1 2 3 4 5 6 7 8 7 |
|---|---|---|
| | address of vector 1 | src |
| | vector 2 | 7 |
| | address of vector 2 | src + 8 |
| | output vector | 1 2 3 4 5 6 7 7 8 |
| | address of output vector | dst |

The merged vectors are 1 2 3 4 5 6 7 7 8 which are delivered into the data I/O unit 13.

Optionally, based on the foregoing operation device, the operation method may be implemented as follows:

the instruction processing unit 111 decodes the vector sorting instruction into microinstruction performed by the operation unit;

the operation unit 12 sorts the data vector to be sorted or the intermediate result according to the microinstruction, and obtains a sorted vector having the same length as the data vector to be sorted.

Optionally, the operation unit 12 sorts the data vector to be sorted or the intermediate result according to the microinstruction as follows:

Step A: if what obtained after the sorting is the intermediate result of the data vector to be sorted, writing the intermediate result of the data vector to be sorted back to the source address of the storage unit, and repeatedly executing step A until obtaining the final result of the data vector to be sorted, then go to step B; step B: if what obtained after the sorting is the final result of the data vector to be sorted, writing the final result of the data vector to be sorted back to the data I/O unit of the storage unit according to the destination operand address provided by the vector sorting instruction, and the operation ends.

Optionally, the operation unit 12 includes n vector merging units, wherein n is an integer greater than or equal to 2; n vector merging units read no more than 2n sub-vectors having been merged or ordered sub-vectors from the storage unit, merge them and store the result to the storage unit until the length of the sub-vectors having been merged is equal to the length of the data vector to be sorted to form a sorted vector.

Further optionally, the operation unit 12 performs step A specifically as follows:

Step A1: initializing the number of merging i to 1;

Step A2: performing calculation by the n vector merging units, and when merging the data vector to be sorted or the intermediate result at the ith time, obtaining the data vector to be sorted or the intermediate result from the storage unit, dividing the data vector or the intermediate result to be sorted into $[m/2^{i-1}]$ portions in order, and merging the vectors into pairs, each vector except for the last one having a length of $2^{i-1}$, where m is the length of the data vector to be sorted;

Step A3: increasing the number of merging by one if the number of merging i<$[\log_2 m]$ and writing the processed intermediate result back to a source address of the storage unit, repeating executing steps A2 to A3 until i=$[\log_2 m]$, then go to step B;

the operation unit 12 performs step B, specifically:

if the number of merging i=$[\log_2 m]$ and if there are only two data vectors to be sorted after assignment, the obtained vector is a vector having been sorted after being merged by the first vector merging unit of the $n_{th}$ vector merging unit, writing the sorted result in the data output unit according to the destination operand address provided by the vector sorting instruction, and the operation ends.

Further optionally, the operation unit 12 performs a pairwise merging of the vectors, specifically:

numbering 1, 2, . . . , $[m/2^{i-1}]$ in order according to the source operand address provided by the vector sorting instruction, assigning the vector numbered 2*j−1, 2*j to the $((j-1) \bmod n)+1)_{th}$ vector merging unit for processing, where j>0.

Further optionally, the data vector to be sorted is a characteristic value vector and a probability vector of the classification result corresponding to the matrix for testing data characteristics at the preprocessing stage.

Further optionally, the first instruction comprises one or any combination of the following instructions: inter-vector AND instruction VAV, intra-vector AND instruction VAND, inter-vector OR instruction VOV, intra-vector OR instruction VOR, vector index instruction VE, vector logarithmic instruction VL, vector greater than decision instruction VGT, vector equal to decision instruction VEQ, vector NOT instruction VINV, vector selection and merge instruction VMER, vector maximum instruction VMAX, scalar extension instruction STV, scalar-vector replacement instruction STVPN, vector-scalar replacement instruction VPNTS, vector retrieval instruction VR, vector dot product instruction VP, random vector instruction RV, cyclic shift instruction VCS, vector load instruction VLOAD, vector storage instruction VS, vector moving instruction VMOVE, matrix retrieval instruction MR, matrix load instruction ML, matrix storage instruction MS and matrix moving instruction MMOVE.

Further optionally, the device is used for a sparse neural network operation or a dense neural network operation.

Through the embodiments of the present application, the vector sorting instruction is decoded into a micro-instruction performed by the operation unit, the data vector to be sorted or the intermediate result is sorted according to the micro-instruction, and a sorted vector having the same length as the data vector to be sorted is obtained. With respect to the prior art where the related operations are serially performed, it is difficult to use the parallelism of the sorting algorithm, the operation speed is slow, and the vector sorting algorithm is divided into and decoded into a series of instruction sequences, and the decoding overhead is also large. The present application can perform sorting in parallel and reduce decoding overhead, thereby improving the sorting efficiency.

Figure 1H:
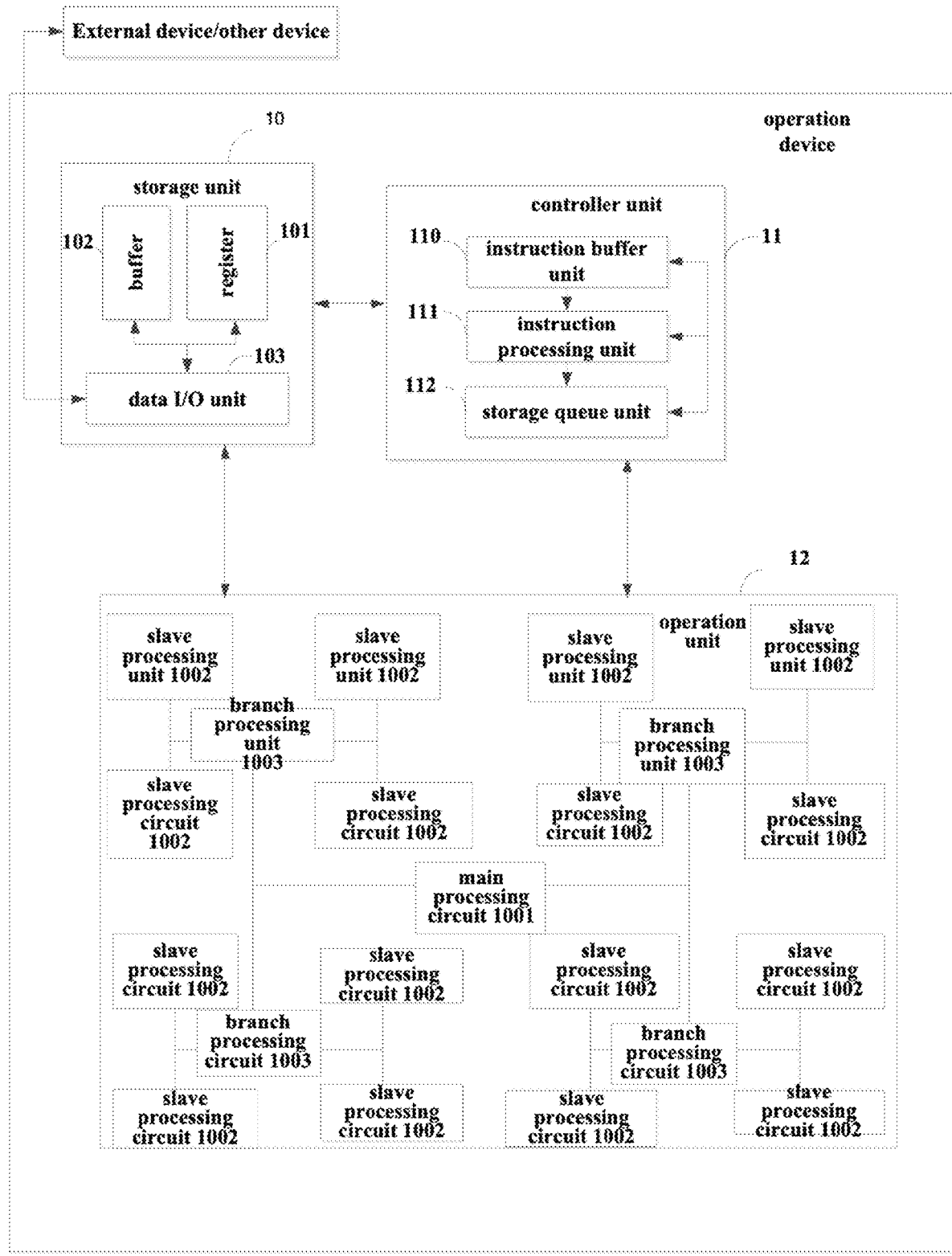
FIG. 1H shows another structural schematic diagram of an operation device according to embodiments of the present application.
Figure 1I:
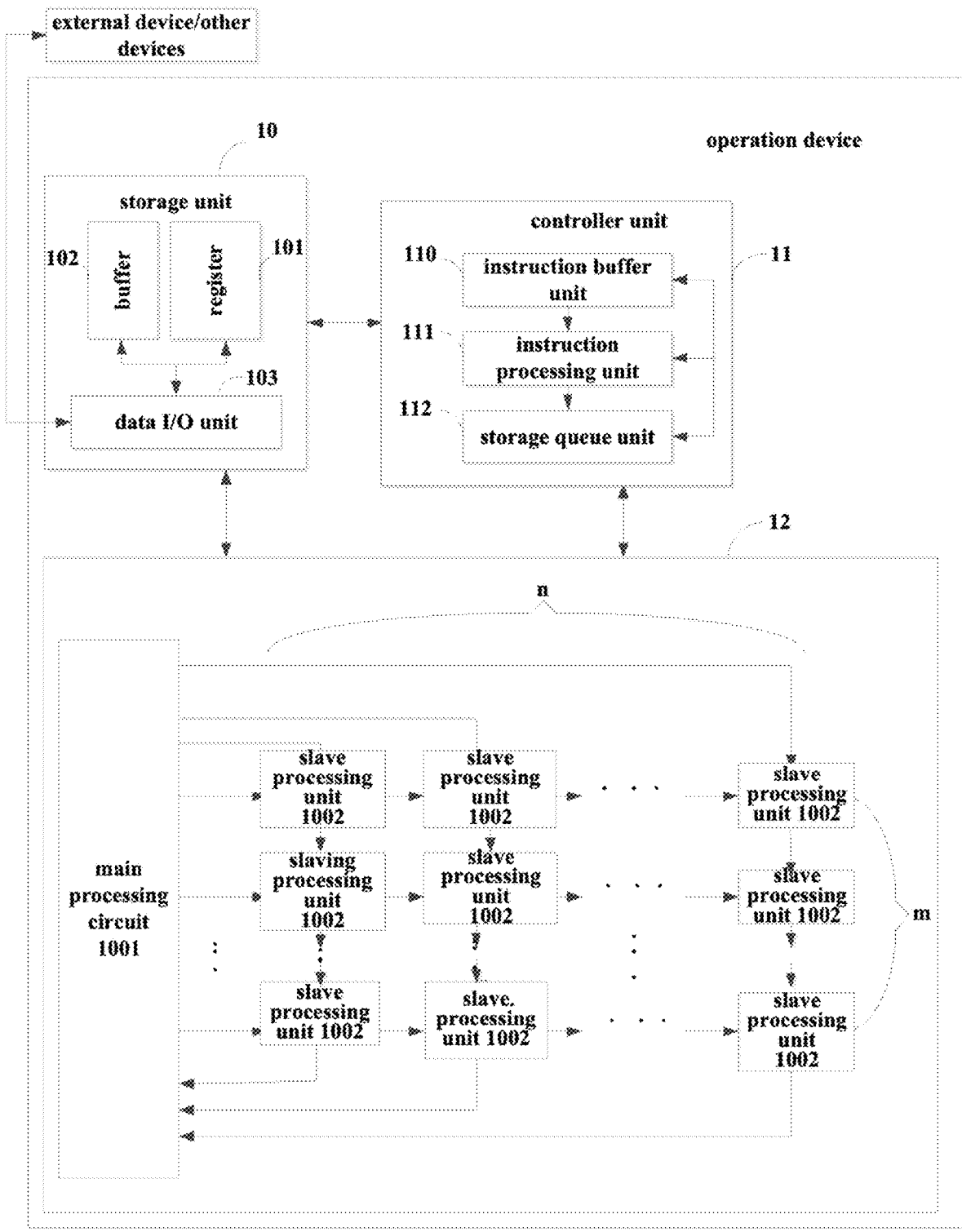
FIG. 1I shows a structural schematic diagram of another operation device according to embodiments of the present disclosure.

In an optional embodiment, FIG. 1H is a variant structure of the operation device as shown in FIG. 1A, and the operation unit 12 as shown in FIG. 1H may include a branch processing circuit 1003; the specific connection structure is shown in FIG. 1I, wherein, a master processing circuit 1001 is connected to a branch processing circuit 1003, and the branch processing circuit 1003 is connected to a plurality of slave processing circuit 1002;

the branch processing circuit 1003 configured to perform forwarding data or instructions between the master processing circuit 1001 and the slave processing circuit 1002.

In another optional embodiment, the operation unit 12, as shown in FIG. 1C, may include a master processing circuit 1001 and a plurality of slave processing circuits from 1002. In one embodiment, as shown in FIG. 1C, a plurality of slave processing circuits are assigned in an array; each slave processing circuit is connected to other neighboring slave processing circuits, the master processing circuit is connected to k slave processing circuit of the plurality of slave processing circuits, said K basic circuits are n slave processing circuits in the first line, n slave processing circuits in the $m_{th}$ line and m slave processing circuits in the first column.

K slave processing circuits are configured to forward data and instructions between the master processing circuit and the plurality of slave processing circuits.

Figure 1J:
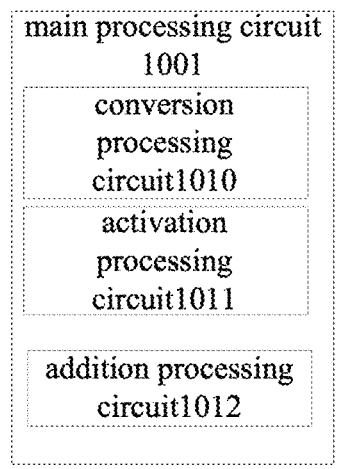
FIG. 1J shows a structural schematic diagram of a master processing circuit according to embodiments of the present application.

Optionally, as shown in FIG. 1J, the master processing circuit may also include one or any combination of a conversion processing circuit 1010, an activation processing circuit 1011 and an addition processing circuit 1012;

a conversion processing circuit 1010 is configured to perform an interchange between the first data structure and the second data structure (for example, conversion between continuous data and discrete data) on a data block received by the master processing circuit or an intermediate result, or perform an interchange between the first data type and the second data type (for example, conversion between fixed-point type and floating-point type) on a data block or an intermediate result received by the master processing circuit;

the activation processing circuit 1011 is configured to perform activation operations of the data in the master processing circuit;

the addition processing circuit 1012 is configured to perform addition operations or accumulation operations.

The master processing circuit is configured to assign an input data to a plurality of data blocks and send at least one of the plurality of data blocks and at least one of the operation instructions to the slave processing circuit;

the plurality of slave processing circuits are configured to perform operations on the received data blocks according to the operation instruction to obtain an intermediate result and transmit the result of the operation to the master processing circuit;

the master processing circuit is configured to process an intermediate result sent by the plurality of slave processing circuits to obtain a result of that operation instruction and send the result of that operation instruction to the controller unit.

The slave processing circuit comprises a multiplication processing circuit;

The multiplication processing circuit is configured to perform a multiplication operation on the received data block to obtain a multiplication result;

a forwarding processing circuit (optionally) is configured to forward the received data block or the multiplication result.

an accumulation processing circuit, the accumulation processing circuit, is used to perform an accumulation operation on the multiplication result to obtain the intermediate result.

In another embodiment, the operation instruction is a calculation instruction such as a matrix-multiplying-matrix instruction, an accumulation instruction, an activation instruction. The operation device provided by the present application sets up an interconnection unit which connects the calculator combinations in the operation unit according to the need of the operation instruction to obtain a operation topology structure corresponding to the operation instruction, and then it is unnecessary to perform storage or extraction operations on the operated intermediate data in the subsequent operation of the operation unit. This structure realizes an advantage that a single instruction can realize one-time input, that is, can perform a plurality of operations of an calculator and obtain calculation results, thereby improving the commutating efficiency.

Figure 1K:
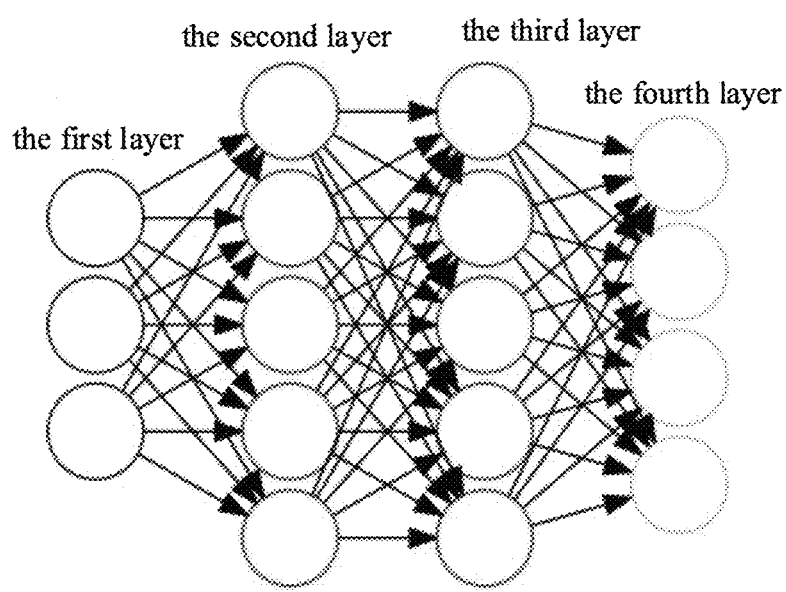
FIG. 1K shows a schematic diagram of a structure graph of a neural network model provided by an embodiment of the present application.

Among them, the data conversion unit 16 obtains a part of nodes in the structure graph from the external of the device, determines whether the node is processed by the operation unit 12 through the controller unit 11, and if it has been processed, the node is discarded without performing any operation and if it has been processed, the node is performed with a conversion of the node format, and after the conversion is completed, the converted node is written into the storage unit 10. The controller unit 11 reads the instruction from the external of the operation device and writes it to the storage unit 10 without a conversion. The node of the structure graph (as shown in FIG. 1K which provides a schematic diagram of the structure graph) obtained from the external of the device for the first time is a source node s, and the node obtained for the $i_{th}$ time is an adjacent node of the candidate node after the $(i-1)_{th}$ (i>1) calculation and the adjacent node is not processed by the operation unit. Optionally, the node n of the structure graph obtained from the external of the device is converted into the following format:

(Addr(before(n)), F(n), n, vis)

wherein before(n) represents precursor node of the node n, (Addr(before(n)) represents an address of the precursor node of node n in the storage unit 10, F(n) represents the total cost generated on the path from the source node s to the node n, and n represents the attribute of the node for calculating the resulting cost of a single node n, vis represents whether this node has been accessed, for example, it is labeled as 0 if it is not accessed and it is labeled as 1 if it is accessed, and as to the source node before(n), it is n itself, F(n) and vis are both set to 0.

A storage unit 10 is configured to acquire the instruction and the converted data from the data conversion unit i.e., data conversion unit 14, provide data to the operation unit 12, store the data processed by the operation unit 12, obtain an approximate optimal path result, and store, and finally write the approximate optimal path result back to the external of the device.

An operation unit 12 acquires, from the storage unit 10, the node with vis=0 in the node information, that is, the node that has not been accessed, and the partial information of the precursor node of this node is integrated into that node to form the following format:

(F(before(n)), F(n), n, vis)

wherein, F(before(n)) represents the price-value corresponding to the path of the precursor node from the source node s to n, F(n)=0. In the operation unit, the price-value generated by the node n is operated based on the preset cost function, and then the total price-value F(n)=f(n)+F(before (n)) corresponding to the path from the source node to the node n is obtained. At this time, there are m nodes transmitted to the operation unit 12, respectively $n_1, n_2, \ldots n_m$, and the price-values $F(n_1), F(n_2), \ldots F(n_m)$ corresponding to m paths can be operated. The corresponding m nodes are sorted in order of the price-value $F(n_1), F(n_2), \ldots F(n_m)$ from small to large to obtain $n_1', n_2', \ldots n_m'$. It is determined whether the path from the source node s to $n_1'$ constitutes a complete approximate optimal path, and if so, an operation termination instruction is transmitted to the controller unit 11, and the node information (Addr(before(n)), F(n), n, 1) corresponding to $n_1'$ is transmitted to the storage unit 10. The preset cost function in the embodiments of the present application may be at least one of the following functions: a mean square error cost function, a cross entropy cost function, or a cost function in a neural network.

Optionally, it is assumed that the operation device allows the maximum number of candidate nodes to be k. When m≤k, the corresponding m nodes can be used as candidate nodes, and the updated (Addr(before(n)), F(n), n, 1) are written into the storage unit 10; when m>k, the node information (Addr(before(n)), F(n), n, 1) corresponding to $n_1', n_2', \ldots n_k'$ can be written back to the storage unit 10.

The operation unit 12 can maintain an empty stack inside the unit, and after receiving the integration instruction transmitted by the controller unit 11, integrate the node information (Addr(before(n)), F(n), n, 1), specifically, push the node n into the stack, and then, acquire the precursor node of the top node of the stack from the storage unit 10 and push it into the stack until before(n) in the information of the top node of the stack is n, that is, the top node of the stack is the source node of the graph. Then, the nodes in the stack continuously pop out of the stack and are transmitted to the storage unit 10 in order, and the sequence of nodes acquired in the storage unit 10 is the approximate optimal path finally obtained.

The controller unit 11 acquires an instruction required for the operation through the storage unit 10, and the storage unit 10 reads the node that was stored from the external of the operation device last time and has not been operated by the operation unit 12, controls the operation unit 12 to perform the data operation, receives the operation termination instruction transmitted by the operation unit 12, and controls the data transmission between the operation unit 12 and the storage unit 10.

Figure 1L:
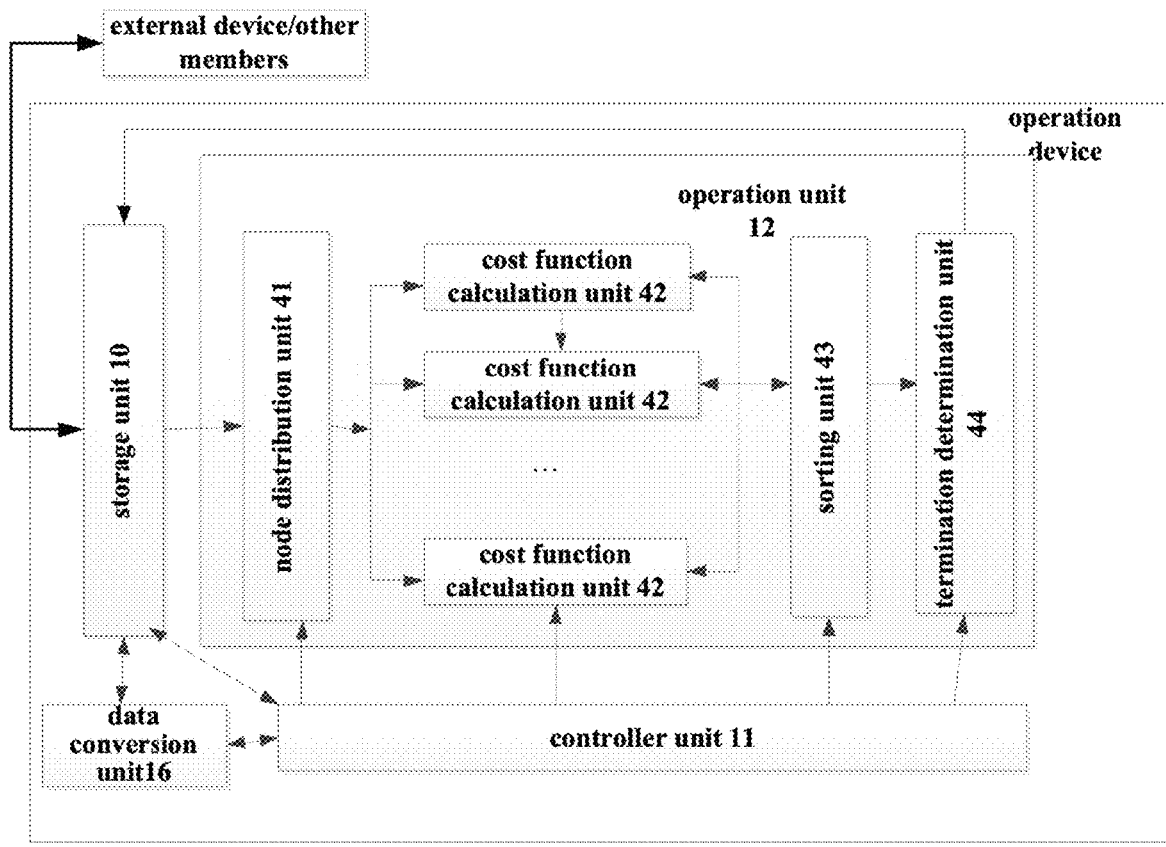
FIG. 1L shows another structural schematic diagram of an operation device according to embodiments of the present disclosure.

Referring to FIG. 1L, the operation unit 12 in FIG. 1L includes a node distribution unit 41, a cost function calculation unit 42, a sorting unit 43 and a termination determination unit 44.

Wherein, the node distribution unit 41 assigns the nodes $n_1, n_2, \ldots n_m$ acquired by the storage unit 10 to the L cost function calculation units 42 respectively which calculates corresponding path costs, where the first L−1 cost function calculation units assign [m/L] nodes respectively, the Lth cost function calculation units assign m-[m/L] nodes, where "[ ]" indicates rounding up.

As shown in FIG. 1L, there are L cost function calculation units in total, and each cost function calculation unit 42 can realize the price-value from the source node to the corresponding path independently. Each cost function calculation unit 42 calculates the node assigned by the node distribution unit 41 to obtain the corresponding node number-path price-value pairs $(n_1, F(n_1))$, $(n_2, F(n_2))$, ... $(n_m, F(n_m))$, calculate the cost of the path function according to actual needs, set up by the controller unit 11, then, transmit the operated node number-path price-value pairs $(n_1, F(n_1))$, $(n_2, F(n_2))$, ... $(n_m, F(n_m))$ to the sorting unit 43.

Optionally, the cost function calculation unit may include a multiplier and an adder.

The sorting unit 43 sorts the node number-path cost value pairs $(n_1, F(n_1))$, $(n_2, F(n_2))$, ... $(n_m, F(n_m))$ of each node obtained from the cost function calculation unit 32 according to the cost value of the path from small to large to obtain the sorted node number-path cost value pairs $(n_1', F(n_1))'$, $(n_2', F(n_2))'$, ... $(n_m', F(n_m)')$ and then transmit them to the termination determination unit 34.

The termination determination unit 44 obtains the sorted node number-path cost value pairs from the sorting unit 43 and determines whether the approximate optimal path has been obtained according to $(n_1', F(n_1))'$, where the method to determine whether the approximate optimal path has been obtained is set by the controller unit 11 according to the actual problem. If the approximate optimal path has been obtained, the termination determination unit 34 sends the operation termination instruction to the controller unit 11 and sends the node information (Addr(before(n)), F(n), n, 1) corresponding to $n_1'$ to the result storage unit 10. Otherwise, assuming that the maximum number of candidate nodes allowed by the device is k, if m≤k, the corresponding m nodes, which are all taken as candidate nodes, write the updated (Addr(before(n)), F(n), n, 1) back to the storage unit 10; if m>k, write the node information (Addr(before(n)), F(n), n, 1) corresponding to $n_1', n_2', \ldots n_k'$ back to the storage unit 10.

For example, an optimal path searching method is provided as follows:

Step 1: obtaining the operation instructions required for the operation from the external of the operation device, storing them in the storage unit 10 through a data conversion unit 16 and transmitting them to the controller unit 11.

Step 2: transmitting some nodes in the original graph to data transformation unit 16 from the external of the operation device, and the structure diagram external the device can be adjacency list, adjacency matrix, vertex pairs or other forms, where only the source node s was transmitted at the first transmission, and the nodes which are then transmitted to the data transmission unit 1 are adjacent nodes that have not been processed by the operation unit 12 of the candidate node screened by the operation unit 12 last time. In this process, the controller unit 11 determines whether the corresponding nodes have been processed by operator unit 12. The data transformation unit 16 converts the transmitted nodes in a format (Addr(before(n)), F(n), n, vis) and transmits them to the storage unit 10.

In step 3, the controller unit 11 controlling the operation unit 12 to acquire the unprocessed nodes $n_1, n_2, \ldots n_m$ that are transmitted by the data conversion unit 16 from the storage unit 10 and integrating the information of each node and the precursor node to obtain the nodes in a format of (Addr(before(n)), F(n), n, vis); then the operation unit 12 obtaining the total price-value F(n)=f(n)+F(before(n)) corresponding to the path from the source node to node n based on the price-value f(n) resulted by the preset cost function calculating the node n. Calculating the price-values $F(n_1)$, $F(n_2)$, ... $F(n_m)$ corresponding to m paths respectively, obtaining $n_1', n_2', \ldots n_m'$ by sorting the corresponding m nodes in an order of the price-value $F(n_1), F(n_2), \ldots F(n_m)$ from small to large, and determining whether the path from the source node s to $n_1'$ constitutes a complete approximate optimal path. If so, send an operation termination instruction to the controller unit 11 and transmit the node information (Addr(before(n)), F(n), n, 1) corresponding to $n_1'$ to the storage unit 10, and goes to step 4. Otherwise, assuming that the maximum number of candidate nodes allowed by the device is K, if m≤k, the corresponding m nodes are all taken as candidate nodes to write the updated (Addr(before(n)), F(n), n, 1) to the storage unit 10; if m>k, write the node information (Addr(before(n)), F(n), n, 1) corresponding to $n_1', n_2', \ldots n_k'$ back to the storage unit 10, and goes to step 2.

In step 4, after receiving the operation termination instruction from the operation unit 12, the controller unit 11 determines whether the result storage unit 10 has obtained node information from the operation unit 12, and if the node information is not obtained, the determination is circularly made until the node information is obtained; the result storage unit 11 maintains an empty stack within the unit, and after the operation result is obtained, pushes the node information (Addr(before(n)), F(n), n, 1) received from the operation unit 12 into the stack; the precursor node of the top node of the stack is obtained from the storage unit 10 and is pressed into the stack, which is repeated until before(n) in the information of the top node of the stack is n, that is, the top node of the stack is the source node of the graph. Then the storage unit 10 continuously pushing the nodes out of the stack and sending them into the storage unit 10 in order, and then the sequence of nodes obtained in the storage unit 10 is the approximate optimal path finally obtained.

In step 5, the storage unit 10, under control of the controller unit 11, obtains an approximate optimal path from the storage unit 10 and transmits it to the external of the device.

Find an approximate optimal path that can satisfy the conditions by using the embodiments of the present application to search the structure graphs can reduce the waste of space effectively and improves the efficiency of time, and in the process of calculating the cost of path, performing calculation by using a plurality of cost function calculation units at the same time can improve the parallelism of computation.

It should be explained that the above operation device can not only perform sparse neural network operations but also perform dense neural network operations. The above device is especially suitable for sparse neural network operations because there are many data with zero value or small absolute value in the sparse neural network. These data can be presented by the mapping unit, and the efficiency of operation can be improved if the accuracy of operation is guaranteed.

It should be pointed out that the input neurons and operation results (or output neurons) mentioned in the embodiments of the present application do not refer to neurons in the input layer and neurons in the output layer of the whole neural network, but for any adjacent two layers of neurons in the neural network, the neurons in the lower layer of the network feedforward operation is the input neurons, the neurons in the upper layer of the network feedforward operation is the operation result. Taking the convolution neural network as an example, and assuming that a convolution neural network has L layers, K=1, 2, 3 ... L−1. For the layer K and the layer K+1, the layer K is called the input layer, and the neurons in this layer are the above input neurons, and the layer K+1 is called the input layer. The neurons in this layer are the above operation results, that is, except the top layer, each layer can be the input layer, and the next layer is the corresponding output layer.

Each of the above units may be a hardware circuit including a digital circuit, an analog circuit, or the like. Physical implementations of the hardware circuit include, but are not limited to, physical devices including, but not limited to, transistors, memristors and the like. The calculation unit in the above neural network calculating module may be any suitable hardware processor such as a CPU, GPU, FPGA, DSP, ASIC and the like. The above storage unit, the instruction buffering unit, the first input buffer unit, the second input buffer unit and the output buffer unit may be any suitable magnetic storage medium or magneto-optical storage medium, such as RRAM, DRAM, SRAM, EDRAM, HBM, HMC and the like.

In a possible embodiment, the embodiment of the present application provides a neural network calculating device, where the neural network calculating device includes one or more neural network operation modules according to the embodiments for acquiring data to be operated and control information from other processing devices, performing the specified neural network operation, and transmitting the execution result to other processing devices through an I/O interface;

when the neural network calculating device includes a plurality of the neural network operation modules, the plurality of the neural network operation modules may connect through a specific structure and transmit data;

wherein the plurality of operation devices interconnect through the PCIE bus to support operations of a larger-scale neural network and transmit data; the plurality of operation devices share the same control system or have respective control systems and the devices share a memory or have their own memories; the interconnection manner of the plurality of operation devices is an arbitrary interconnection topology.

The neural network calculating device has high compatibility and can be connected to various types of servers through a PCIE interface.

In a possible embodiment, the embodiments of the present application provide a combined processing device including the above-described neural network calculating device, a universal interconnection interface and other processing devices.

Figure 2A:
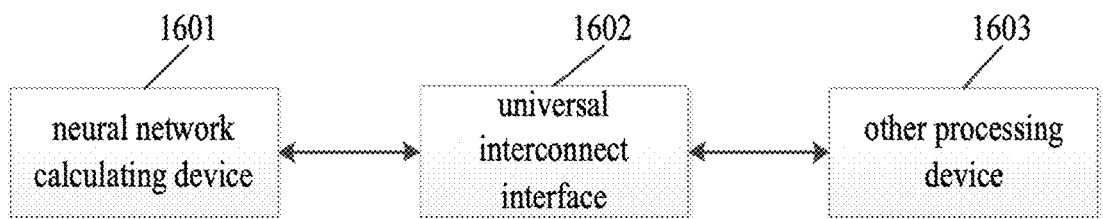
FIG. 2A shows a structural schematic diagram of a combined processing device according to embodiments of the present application.

The neural network calculating device interacts with other processing devices to perform user-specified operations. Referring to FIG. 2A, FIG. 2A shows a schematic structural diagram of a combined processing apparatus according to embodiments of the present application. As shown in FIG. 2A, the combined processing device includes the above-described neural network calculating device 1601, universal interconnect interface 1602, and other processing devices 1603.

The above other processing device 1603 includes a processor type of one or more of a general-purpose/dedicated processor such as a central processing unit, a graphics processing unit (GPU) and a neural network processor. The number of processors included in the other processing device 1603 is not limited. The other processing device 1603 serving as an interface between the neural network calculating device 1601 and the external data and the control includes data moving, completing basic control such as starting and stopping of the neural network calculating device; the other processing device 1603 can also cooperate with the neural network calculating device 1601 to complete the operation task.

The above universal interconnect interface 1602 is configured to transmit data and control instructions between the neural network calculating device 1601 and other processing devices 1603. The neural network calculating device 1601 obtains the required input data from other processing devices 1603 to write the storage device on the chip of the neural network calculating device 1601, acquire the control instruction from other processing device 1603 to write in the control buffer on the chip of the neural network calculating device 1601 and data in the storage device of the neural network calculating device 1601 can also be read to transmit to other processing devices 1603.

Figure 2B:
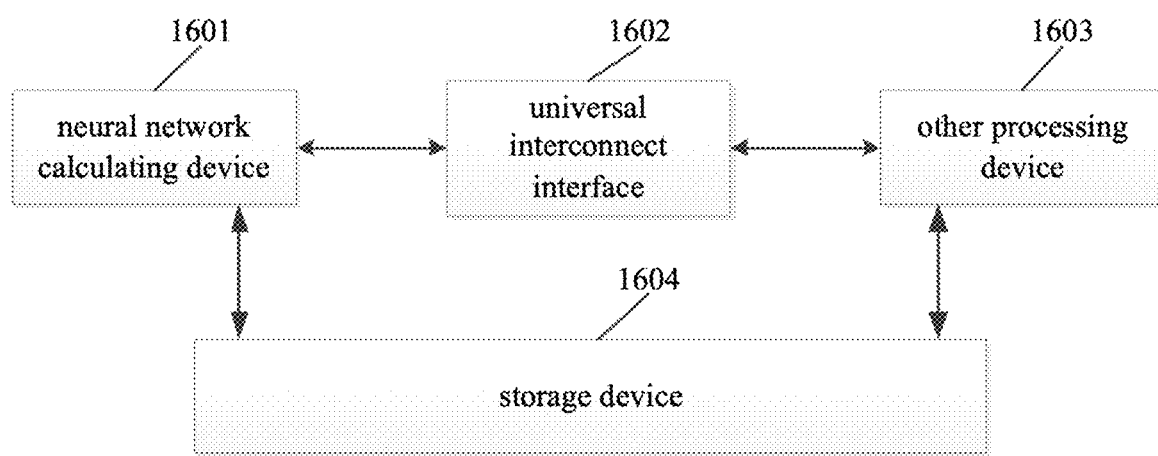
FIG. 2B shows a structural schematic diagram of another combined processing device according to embodiments of the present application.

Optionally, as shown in FIG. 2B, the above combined processing device further includes a storage device 1604 configured to store data required by the present operation unit/operation device or other operation units and is particularly suitable for the data required to be calculated but cannot be completely stored in the internal memory of the present network operation device 1601 or other processing device 1603.

The above combination device can be used as an on-chip system for smart devices such as mobile phones, robots, and drones, effectively reducing the core area of the control portion, increasing the processing speed and reducing the overall power consumption.

In a possible embodiment, the embodiments of the present application provide a neural network chip which includes the operation device described in any of the illustrated embodiments or the above-described neural network calculating device or the combined processing device.

In a possible embodiment, the embodiments of the present application provide a neural network chip package structure which includes the above neural network chip.

In a possible embodiment, the embodiments of the present application provide a board card which includes the above neural network chip package structure.

In a possible embodiment, the embodiments of the present application provide an electronic device including the above-mentioned board card.

The electronic device includes a data processing device, a robot, a computer, a printer, a scanner, a tablet, a smart terminal, a mobile phone, a driving recorder, a navigator, a sensor, a camera, a cloud server, a camera, a camera, a projector, and a watch, headsets, a removable storage, a wearable device vehicle, a household appliance, and/or a medical device.

The above-mentioned transportation includes airplanes, ships and/or vehicles; the above-mentioned household appliances include televisions, air conditioners, microwave ovens, refrigerators, rice cookers, humidifiers, washing machines, electric lights, gas stoves, range hoods; the medical equipment includes nuclear magnetic resonance instruments, B-mode ultrasound instrument and/or electrocardiograph.

The embodiments of the present application further provide a computer storage medium, wherein the computer storage medium may store a program, and the program includes some or all of the steps of any one of the neural network operation methods according to the method embodiments. It should be noted that, for the foregoing method embodiments, for the sake of brevity, they are all described as a series of action combinations, but those skilled in the art should understand that the present application is not limited by the described action sequence. It is because certain steps may be performed in other sequences or concurrently in accordance with the present application. Secondly, those skilled in the art should also understand that the embodiments described in the specification are optional embodiments, and the actions and modules involved are not necessarily required by the present application.

In the above embodiments, the descriptions of the various embodiments are all focused on, and the parts that are not detailed in a certain embodiment can be referred to the related descriptions of other embodiments.

In the several embodiments provided herein, it should be understood that the disclosed apparatus may be implemented in other ways. For example, the device embodiments described above are merely illustrative, for example, the division of the unit is only a logical function division and there may be another division manner in the actual implementation, for example, multiple units or components may be combined or may be integrated into another system, or some features can be ignored or not performed. In addition, the mutual coupling or direct coupling or communication connection shown or discussed may be an indirect coupling or communication connection through some interfaces, devices or units, and may be electrical or other forms.

The units described as separate components may or may not be physically separated, and the components displayed as units may or may not be physical units, that is, may be located in one place, or may be assigned to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit. The above integrated unit can be implemented in the form of hardware or in the form of a software program module.

The integrated unit, if implemented in the form of a software program module and sold or used as a standalone product, may be stored in a computer readable memory. Based on such an understanding, the technical solution of the present application, in essence or the contribution to the prior art, or all or part of the technical solution may be embodied in the form of a software product, which is stored in a memory. A number of instructions are included to cause a computer device (which may be a personal computer, server or network device, etc.) to perform all or part of the steps of the methods described in various embodiments of the present application. The foregoing memory includes: a U disk, a Read-Only Memory (ROM), a Random Access Memory (RAM), a removable hard disk, a magnetic disk, or an optical disk, and the like which can store program codes.

An ordinary person skilled in the art can understand that all or part of the steps of various methods of the above embodiments can be implemented by a program to instruct related hardware, the program can be stored in a computer readable memory, and the memory may include a flash disk, a Read-Only Memory (ROM), a Random Access Memory (RAM), disk or CD and the like.

The embodiments of the present application have been described in detail. The principles and implementations of the present application are described in the specific examples, and the description of the above embodiments is only used to help understand the method and core ideas of the present application; meanwhile, a person skilled in the art may have a change in the specific embodiments and the scope of application according to the idea of the present application. In summary, the content of the present specification should not be construed as limiting the present application.

What is claimed is:

1. An operation device, comprising:
a storage unit configured to store data and instructions;
a controller unit configured to extract, from the storage unit, a first instruction including sorting instructions or sparse processing instructions and a first data corresponding to the first instruction including input neuron data and weight data; and
an operation unit configured to, in response to the first instruction, perform an operation corresponding to the first instruction on the input neuron data and the weight data, to obtain an operation result,
wherein the first data further comprises sparse parameters,
wherein the device further comprises a sparse unit configured to perform a sparse processing on the operation result according to the sparse parameters to obtain an operation result after the sparse processing,
wherein the sparse parameters include a sparse mode, and
wherein the mapping unit performs a mapping processing on the input neuron data and the weight data according to the mapping mode, by:
obtaining, when the sparse mode is a sparse mode 1, a weight sparse sequence corresponding to the sparse mode 1 and performing a mapping processing on the weight according to that weight sparse sequence;
obtaining, when the sparse mode is a sparse mode 2, a neuron sparse sequence corresponding to the sparse mode 2 and performing a mapping processing on the input neuron data according to the neuron sparse sequence; and
obtaining, when the sparse mode is a sparse mode 3, a weight sparse sequence and a neuron sparse sequence corresponding to the sparse mode 3 and performing a mapping processing on the input neuron data and the weight data according to the weight sparse sequence and the neuron sparse sequence.

2. The device according to claim 1, wherein the controller unit comprises an instruction buffer unit configured to buffer the instructions and an instruction processing unit configured to implement a decoding function.

3. The device according to claim 2, further comprising: a configuration parsing unit and a mapping unit, and when the first instruction is the sparse processing instruction and the first data further includes preset configuration data,
the configuration parsing unit is configured to set a mapping mode according to the preset configuration data;
the mapping unit is configured to perform mapping processing on the input neuron data and the weight data according to the mapping mode to obtain an input neuron-weight pair which is a mapping relationship between the input neuron data and the weight data after the mapping processing;
the instruction buffer unit is configured to receive a target instruction transmitted by the controller unit;
the instruction processing unit is configured to decode the target instruction into an operation instruction; and
the operation unit performs a calculating operation on the input neuron-weight pair to obtain an operation result.

4. The device according to claim 1, wherein
the sparse parameters further comprises a sparse rate, and the sparse unit performs sparse processing on the operation result according to the sparse parameters, by:
sorting the absolute values of elements of neuron data, calculating the number of elements that require sparse processing according to the sparse rate, then performing a sparse processing on the elements of the sorted neuron data according to the number of elements that need to be taken sparse processing, and transmitting the sparse neuron data after being taken sparse processing and neuron sparse sequences to the controller unit.

5. The device according to claim 1, wherein
the sparse unit performs a sparse processing on the operation result according to the sparse parameters, in such a way that elements whose neuron data is 0 remains unchanged, and the elements whose neuron data is within a preset value interval are set to 0.

6. The device according to claim 2, wherein
if the input neuron data is a vector; the first instruction is a vector sorting instruction and the first data is a data vector to be sorted and an intermediate result of the data vector to be sorted; the controller unit comprises an instruction processing unit, the instruction processing unit is configured to decode the vector sorting instruction into a microinstruction performed by the operation unit; and
the operation unit is further configured to sort the data vector to be sorted or the intermediate result according to the microinstruction to obtain a sorted vector having the same length as the data vector to be sorted.

7. The device according to claim 6, wherein
the operation unit sorting the data vector to be sorted or the intermediate result according to the microinstruction comprises:
step A of, if what obtained after the sorting is the intermediate result of the data vector to be sorted, writing the intermediate result of the data vector to be sorted back to a source address of the storage unit, and repeatedly executing step A until obtaining a final result of the data vector to be sorted, then going to step B; and
step B of, if what obtained after the sorting is the final result of the data vector to be sorted, writing the final result of the data vector to be sorted back to a data I/O unit of the storage unit according to a destination operand address provided by the vector sorting instruction.

8. The device according to claim 7, wherein
the operation unit includes n vector merging units, where n is an integer greater than or equal to 2;
the n vector merging units are configured to read no more than 2n sub-vectors having been merged or ordered sub-vectors from the storage unit, merge them and store the merged result to the storage unit until the length of the sub-vectors having been merged is equal to the length of the data vector to be sorted to form a sorted vector.

9. The device according to claim 8, wherein
the step A performed by the operation unit comprises:
step A1 of initializing a number of merging i to 1;
step A2 of performing calculation by the n vector merging units, and when merging the data vector to be sorted or the intermediate result at an ith time, obtaining the data vector to be sorted or the intermediate result from the storage unit, dividing the data vector to be sorted or the intermediate result into $[m/2^{i-1}]$ portions in order, and merging vectors into pairs, each vector except for a last one having a length of $2^{i-1}$, where m is the length of the data vector to be sorted; and
step A3 of increasing the number of merging by one if the number of merging $i<[\log_2 m]$ and writing a processed intermediate result back to a source address of the storage unit, repeatedly executing steps A2 to A3 until $i=[\log_2 m]$, then going to step B; the step B performed by the operation unit comprises:
if the number of merging $i=[\log_2 m]$ and if there are only two data vectors to be sorted after assignment, setting an obtained vector as a vector having been sorted after being merged by a first vector merging unit of the n vector merging units, writing a sorted result in a data output unit according to a destination operand address provided by the vector sorting instruction.

10. The device according to claim 9, wherein the operation unit is further configured to perform a pairwise merging of the vectors by numbering 1, 2, . . . , $[m/2^{i-1}]$ in order according to a source operand address provided by the vector sorting instruction, and assigning vectors numbered $2*j-1, 2*j$ to the $((j-1) \bmod n)+1)^{th}$ vector merging unit for processing, where j>0.

11. The device according to claim 10, wherein
the data vector to be sorted is a characteristic value vector and a probability vector of a classification result corresponding to a matrix for testing data characteristics at a preprocessing stage.

12. The device according to claim 11, wherein
the first instruction comprises one or any combination of the following instructions: inter-vector AND instruction VAV, intra-vector AND instruction VAND, inter-vector OR instruction VOV, intra-vector OR instruction VOR, vector index instruction VE, vector logarithmic instruction VL, vector greater-than decision instruction VGT, vector equal-to decision instruction VEQ, vector NOT instruction VINV, vector selection and merge instruction VMER, vector maximum instruction VMAX, scalar extension instruction STV, scalar-vector replacement instruction STVPN, vector-scalar replacement instruction VPNTS, vector retrieval instruction VR, vector dot-product instruction VP, random vector instruction RV, cyclic shift instruction VCS, vector load instruction VLOAD, vector storage instruction VS, vector moving instruction VMOVE, matrix retrieval instruction MR, matrix load instruction ML, matrix storage instruction MS and matrix moving instruction MMOVE.

13. The device according to claim 12, wherein the device is used for a sparse neural network operation.

14. An operation method applicable to an operation device, wherein the operation device comprises a storage unit, a controller unit, and an operation unit,
the operation method comprises:
storing, by the storage unit, data and instructions;
extracting, by the controller unit, from the storage unit a first instruction including sorting instructions or sparse processing instructions and a first data corresponding to the first instruction including input neuron data and weight data; and
in response to the first instruction, performing, by the operation unit, an operation corresponding to the first instruction on the input neuron data and the weight data, to obtain an operation result, wherein the first data comprises sparse parameters;

performing a sparse processing on the operation result by a sparse unit according to the sparse parameters to obtain an operation result after the sparse processing, wherein the sparse parameters include a sparse mode;

wherein a mapping unit performs a mapping processing on the input neuron data and the weight data according to the mapping mode, by:

obtaining, when the sparse mode is a sparse mode 1, a weight sparse sequence corresponding to the sparse mode 1 and performing a mapping processing on the weight according to that weight sparse sequence;

obtaining, when the sparse mode is a sparse mode 2, a neuron sparse sequence corresponding to the sparse mode 2 and performing a mapping processing on the input neuron data according to the neuron sparse sequence; and obtaining, when the sparse mode is a sparse mode 3, a weight sparse sequence and a neuron sparse sequence corresponding to the sparse mode 3 and performing a mapping processing on the input neuron data and the weight data according to the weight sparse sequence and the neuron sparse sequence.

15. The method according to claim 14, wherein the controller unit comprises an instruction buffer unit configured to buffer the instructions and an instruction processing unit configured to implement a decoding function.

16. The method according to claim 15, wherein the operation device further comprises a configuration parsing unit and the mapping unit and when the first instruction is the sparse processing instruction and the first data further includes preset configuration data, the configuration parsing unit sets a mapping mode according to the preset configuration data;

the mapping unit performs mapping processing on the input neuron data and the weight data according to the mapping mode to obtain an input neuron-weight pair which is a mapping relationship between the input neuron data and the weight data after the mapping processing; and the instruction buffer unit receives a target instruction transmitted by the controller unit;

the instruction processing unit decodes the target instruction into an operation instruction; and the operation unit performs a calculating operation on the input neuron-weight pair to obtain an operation result.

17. The method according to claim 14, wherein the sparse parameters further comprises a sparse rate, the sparse unit performs sparse processing on the operation result according to the sparse parameters, by:

sorting the absolute values of the elements of the neuron data, calculating the number of elements that require sparse processing according to the sparse rate, then performing a sparse processing on the elements of the sorted neuron data according to the number of elements that need to be taken sparse processing, and transmitting the sparse neuron data after being taken sparse processing and neuron sparse sequences to the controller unit.

18. The method according to claim 14, wherein the sparse unit performs a sparse processing on the operation result according to the sparse parameters, in such a way that elements whose neuron data is 0 remains unchanged, and the elements whose neuron data is within a preset value interval are set to 0.

19. The method according to claim 15, wherein if the input neuron data is a vector; the first instruction is a vector sorting instruction and the first data is a data vector to be sorted and an intermediate result of the data vector to be sorted; the controller unit comprises an instruction processing unit, the instruction processing unit is configured to decode the vector sorting instruction into a microinstruction performed by the operation unit;

the operation unit is further configured to sort the data vector to be sorted or the intermediate result according to the microinstruction to obtain a sorted vector having the same length as the data vector to be sorted.

20. The method according to claim 19, wherein the operation unit sorting the data vector to be sorted or the intermediate result according to the microinstruction comprises:

step A of, if what obtained after the sorting is the intermediate result of the data vector to be sorted, writing the intermediate result of the data vector to be sorted back to a source address of the storage unit, and repeatedly executing step A until obtaining a final result of the data vector to be sorted, then going to step B; and step B of, if what obtained after the sorting is the final result of the data vector to be sorted, writing the final result of the data vector to be sorted back to a data I/O unit of the storage unit according to a destination operand address provided by the vector sorting instruction.

21. The method according to claim 20, wherein the operation unit includes n vector merging units, where n is an integer greater than or equal to 2;

the n vector merging units is configured to read no more than 2n sub-vectors having been merged or ordered sub-vectors from the storage unit, merge them and store the merged result to the storage unit until the length of the sub-vectors having been merged is equal to the length of the data vector to be sorted to form a sorted vector.

22. The method according to claim 21, wherein the step A performed by the operation unit comprises:

step A1 of initializing a number of merging i to 1;

step A2 of performing calculation by the n vector merging units, and when merging the data vector to be sorted or the intermediate result at an ith time, obtaining the data vector to be sorted or the intermediate result from the storage unit, dividing the data vector to be sorted or the intermediate result into $[m/2^{i-1}]$ portions in order, and merging vectors into pairs, each vector except for a last one having a length of $2^{i-1}$, where m is the length of the data vector to be sorted; and step A3 of increasing the number of merging by one if the number of merging $i<[\log_2 m]$ and writing a processed intermediate result back to a source address of the storage unit, repeatedly executing steps A2 to A3 until $i=[\log_2 m]$, then going to step B;

the step B performed by the operation unit comprises:

if the number of merging $i=[\log_2 m]$ and if there are only two data vectors to be sorted after assignment, an obtained vector is a vector having been sorted after being merged by a first vector merging unit of the n vector merging units, writing a sorted result in a data output unit according to a destination operand address provided by the vector sorting instruction.

23. The method according to claim 22, wherein the operation unit performs a pairwise merging of vectors, by:
numbering 1, 2, . . . , $[m/2^{i-1}]$ in order according to a source operand address provided by the vector sorting instruction, assigning vectors numbered 2*j−1, 2*j to the $((j-1) \bmod n)+1)^{th}$ vector merging unit for processing, where j>0.

24. The method according to claim 14, wherein
the data vector to be sorted is a characteristic value vector and a probability vector of a classification result corresponding to a matrix for testing data characteristics at a preprocessing stage.

25. The method according to claim 14, wherein
the first instruction comprises one or any combination of the following instructions: inter-vector AND instruction VAV, intra-vector AND instruction VAND, inter-vector OR instruction VOV, intra-vector OR instruction VOR, vector index instruction VE, vector logarithmic instruction VL, vector greater-than decision instruction VGT, vector equal-to decision instruction VEQ, vector NOT instruction VINV, vector selection and merge instruction VMER, vector maximum instruction VMAX, scalar extension instruction STV, scalar-vector replacement instruction STVPN, vector-scalar replacement instruction VPNTS, vector retrieval instruction VR, vector dot-product instruction VP, random vector instruction RV, cyclic shift instruction VCS, vector load instruction VLOAD, vector storage instruction VS, vector moving instruction VMOVE, matrix retrieval instruction MR, matrix load instruction ML, matrix storage instruction MS and matrix moving instruction MMOVE.

26. The method according to claim 14, wherein the operation device is used for a sparse neural network operation.

* * * * *